(12) United States Patent
Suzuki et al.

(10) Patent No.: US 9,376,850 B2
(45) Date of Patent: Jun. 28, 2016

(54) OPENING/CLOSING ASSISTANCE DEVICE FOR OPENING/CLOSING DEVICE

(71) Applicant: AISIN SEIKI KABUSHIKI KAISHA, Kariya-shi (JP)

(72) Inventors: Ryusei Suzuki, Kariya (JP); Toshihiro Kobayashi, Nagoya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 43 days.

(21) Appl. No.: 14/383,997

(22) PCT Filed: Mar. 8, 2013

(86) PCT No.: PCT/JP2013/056468
§ 371 (c)(1),
(2) Date: Sep. 9, 2014

(87) PCT Pub. No.: WO2013/137143
PCT Pub. Date: Sep. 19, 2013

(65) Prior Publication Data
US 2015/0052704 A1    Feb. 26, 2015

(30) Foreign Application Priority Data

Mar. 14, 2012 (JP) ................................. 2012-057965

(51) Int. Cl.
*E05F 1/10* (2006.01)
*B60J 5/10* (2006.01)
*E05F 15/622* (2015.01)

(52) U.S. Cl.
CPC .............. *E05F 1/1091* (2013.01); *B60J 5/101* (2013.01); *E05F 1/105* (2013.01); *E05F 15/622* (2015.01);

(Continued)

(58) Field of Classification Search
CPC ........ E05F 1/1041; E05F 1/105; E05F 1/1058; E05F 1/1066; E05F 1/1075; E05F 1/08; E05F 1/1091; Y10T 16/27; Y10T 16/276; Y10T 16/2766; Y10T 16/2769; Y10T 16/281
See application file for complete search history.

(56) References Cited

U.S. PATENT DOCUMENTS

| | | | | |
|---|---|---|---|---|
| 4,429,494 A | * | 2/1984 | Kornerup | E05F 1/1075 49/346 |
| 4,452,015 A | * | 6/1984 | Jacques | E05F 1/1091 49/344 |

(Continued)

FOREIGN PATENT DOCUMENTS

| | | |
|---|---|---|
| CN | 102264993 A | 11/2011 |
| JP | 57 40569 | 3/1982 |

(Continued)

OTHER PUBLICATIONS

International Preliminary Report on Patentability and Written Opinion issued Sep. 16, 2014 in PCT/JP2013/056468.

(Continued)

*Primary Examiner* — Jeffrey O Brien
(74) *Attorney, Agent, or Firm* — Oblon, McClelland, Maier & Neustadt, L.L.P.

(57) ABSTRACT

An opening/closing assist device includes a cam fixed to a first member, which is one of an opening/closing body and a coupling subject of the opening/closing body, a contact element located on a second member, which is the other one of the opening/closing body and the coupling subject, and a damper stay. The damper stay includes a first end rotatably connected to the first member and a second end rotatably connected to the contact element. The contact element is maintained in the state of being pressed against the cam by means of the elastic force of the damper stay. The cam has a shape that is set so that a moment generated at the cam based on the elastic force applied by the contact element is generated so that a moment required to rotate the opening/closing body is in accordance with operation characteristics required for the opening/closing body.

5 Claims, 17 Drawing Sheets

(52) U.S. Cl.
CPC ........ *E05Y 2201/21* (2013.01); *E05Y 2201/264* (2013.01); *E05Y 2201/638* (2013.01); *E05Y 2600/10* (2013.01); *E05Y 2600/30* (2013.01); *E05Y 2600/33* (2013.01); *E05Y 2900/546* (2013.01); *Y10T 16/276* (2015.01)

(56) References Cited

U.S. PATENT DOCUMENTS

| | | | |
|---|---|---|---|
| 6,719,356 B2* | 4/2004 | Cleland | E05F 1/1091 296/146.8 |
| 6,877,830 B2* | 4/2005 | Salice | E05D 15/262 312/319.2 |
| 7,500,287 B2* | 3/2009 | Brustle | E05F 1/1075 16/286 |
| 8,082,629 B2* | 12/2011 | Migli | E05D 15/46 16/286 |
| 8,376,480 B2* | 2/2013 | Brunnmayr | E05D 3/06 312/319.2 |
| 9,260,899 B2* | 2/2016 | Loeffler | E05F 1/1041 |
| 2002/0108311 A1* | 8/2002 | Salice | E05D 15/262 49/371 |
| 2006/0244282 A1* | 11/2006 | Benoit | E05F 1/1091 296/50 |
| 2008/0134464 A1* | 6/2008 | Salice | E05F 1/1058 16/84 |
| 2008/0216289 A1* | 9/2008 | Salice | E05D 3/142 16/366 |
| 2011/0271595 A1* | 11/2011 | Eggeling | E05F 15/622 49/358 |
| 2011/0290050 A1 | 12/2011 | Kummer et al. | |
| 2015/0351539 A1* | 12/2015 | Baldreich | E05D 11/1064 312/319.2 |

FOREIGN PATENT DOCUMENTS

| | | |
|---|---|---|
| JP | 4 325314 | 11/1992 |
| JP | 5 625 | 1/1993 |
| JP | 5 10064 | 1/1993 |
| JP | 5 125866 | 5/1993 |
| JP | 9-169285 A | 6/1997 |
| JP | 2005 54566 | 3/2005 |
| JP | 2006-15824 A | 1/2006 |

OTHER PUBLICATIONS

Combined Office Action and Search Report issued Oct. 19, 2015 in Chinese Patent Application No. 201380013192.3 (with English language translation).

International Search Report Issued Jun. 11, 2013 in PCT/JP13/056468 Filed Mar. 8, 2013.

* cited by examiner

Fully Closed Condition

Fully Open Condition

OPENING/CLOSING ASSISTANCE DEVICE FOR OPENING/CLOSING DEVICE

TECHNICAL FIELD

The present invention relates to an opening/closing assist device for an opening/closing body such as a rear door or the like.

BACKGROUND ART

A rear door of an automobile includes a damper stay that reduces the operation force required to open and close a rear door and hold the door at a fully open position. The damper stay includes a first end, rotatably coupled to the rear door, and a second end, rotatably coupled to a vehicle body. Patent document 1 describes an example of an opening/closing assist device in which an elongated hole is formed at a portion of the rear door where the first end of the damper stay is coupled so that a first end (door side coupling point) of the damper stay is movable relative to the rear door along the elongated hole. An assist moment based on an elastic force of the damper stay is controlled by the movement of the first end of the damper stay along the elongated hole to reduce the operation force required to open and close the rear door.

PRIOR ART DOCUMENT

Patent Document

Patent document 1: Japanese Laid-Open Patent Publication No. 04-325314

SUMMARY OF THE INVENTION

Problems that the Invention is to Solve

In the opening/closing assist device of patent document 1, when opening/closing the rear door, it is considered that the actual position of the first end of the damper stay relative to the elongated hole differs from the ideal position, at which the assist moment is balanced with the weight moment of the rear door. Thus, in the structure that moves the first end of the damper stay coupled to the rear door along the elongated hole, it is difficult to finely adjust the position of the first end of the damper stay in accordance with the open degree of the rear door. Thus, the opening/closing operation characteristics required for the rear door in accordance with the vehicle type, specification, or the like may not be obtained.

It is an object of the present invention to provide an opening/closing assist device for an opening/closing body that increases the degree of freedom for adjustment of the opening/closing operability of the opening/closing body.

Means for Solving the Problems

To achieve the above object, an opening/closing assist device for an opening/closing body supplements an operation force required to open and close the opening/closing body that rotates about a support point located on a coupling subject of the opening/closing body. The opening/closing assist device includes a damper stay configured to be located between the coupling subject and the opening/closing body. The damper stay produces elastic force that supplements the operation force. A cam is configured to be fixed to a first member, which is one of the opening/closing body and the coupling subject, in the vicinity of the support point. A contact element is configured to be located on a second member, which is the other one of the opening/closing body and the coupling subject. The contact element is slidable in a direction intersecting a rotation axis of the opening/closing body. The damper stay includes a first end, rotatably coupled to the first member, and a second end, rotatably coupled to the contact element, and keeps the contact element pushed against the cam by the elastic force. The cam has a shape that is set so that a moment generated at the cam based on the elastic force applied by the contact element is generated so that a moment required to rotate the opening/closing body is in accordance with operation characteristics required for the opening/closing body.

In this structure, the operation characteristics required for the opening/closing body can be obtained by setting the shape of the cam. This is because the magnitude and the direction of the moment resulting from the reaction force of the cam can be adjusted with the shape of the cam on which the contact element slides. This increases the degree of freedom for adjustment of the opening/closing operability of the opening/closing body.

In the opening/closing assist device, the opening/closing body may be configured to rotate about the support point in a vertical direction extending along gravitational force, and the shape of the cam may be set such that a sum of the moment generated at the opening/closing body based on the elastic force and the moment generated at the cam based on the elastic force is balanced with a moment resulting from the weight of the opening/closing body.

In this structure, the sum of the moment generated at the opening/closing body based on the elastic force of the damper stay and the moment generated at the cam is balanced with the moment resulting from the weight of the opening/closing body. This improves the opening/closing operability of the opening/closing body.

In the opening/closing assist device, the shape of the cam may be set so that a cam diameter, which is a distance between a rotation axis of the cam and a cam surface against which the contact element is pushed, differs in each portion of the cam surface.

When the cam diameter changes, the direction and the magnitude of the moment generated at the cam by the reaction force of the elastic force also change. Thus, the moment required for rotating the opening/closing body can be adjusted to close to zero at all open degrees of the opening/closing body by setting different cam diameters for different portions of the cam surface.

In the opening/closing assist device, the opening/closing body is configured to rotate about the support point in a vertical direction along gravitational force, the contact element is configured to slide in the vertical direction intersecting a direction in which the rotation axis of the opening/closing body extends in cooperation with the rotation of the opening/closing body, and the damper stay is configured so that a direction the elastic force of the damper stay acts on the contact element is switched from an upward direction to a downward direction when the opening/closing body opens in the upward direction. In this case, the opening/closing assist device includes a guiding member located on the second member and receiving the contact element to guide the sliding of the contact element in the vertical direction. Further, a stopper may be located between the contact element and the guiding member, between the contact element and the coupling subject, or between the contact element and the opening/closing body. The stopper engages the contact element that moves down when the direction the operation force of the damper stay acts on the contact element is switched from the upward direction to the downward direction.

In this structure, even if the direction the elastic force of the damper stay acts relative to the contact element is switched from the upward direction to the downward direction, the movement of the contact element toward the lower side is restricted when the contact element engages the stopper. This limits separation of the contact element from the cam and, consequently, separation from the guiding member.

In the opening/closing assist device, the cam may include a through groove or a non-through groove that extends in a rotation direction of the cam, and the contact element may include a cam follower that slides on an inner surface of the groove functioning as a cam surface.

Depending on the supporting mechanism of the opening/closing body or the like, when opening or closing the opening/closing body, the elastic force of the damper stay may be switched to the side opposite to the cam. The groove engages the cam follower and limits separation of the cam follower.

In the opening/closing assist device, the stopper is arranged facing the contact element below a movement direction of the contact element, and the shape of the cam is set so that the contact element approaches the stopper as a timing becomes close at which the direction the elastic force of the damper stay acts on the contact element switches from the upward direction to the downward direction when the opening/closing body opens.

In this structure, the contact element approaches the stopper as the timing becomes close at which the direction the elastic force of the damper relative to the contact element acts is switched from the upward direction to the downward direction. In other words, when the direction the elastic force of the damper stay relative to the contact element acts is switched from the upward direction to the downward direction, the contact element does not suddenly move to the lower side. As the distance between the contact element and the stopper decreases, the movement distance of the contact element toward the lower side decreases, and the impact when the contact element contacts the stopper becomes small.

In the opening/closing assist device, a buffer member may be located between the contact element and the stopper.

In this structure, when the direction the elastic force of the damper stay relative to the contact element acts is switched from the upward direction to the downward direction, the contact element contacts the stopper by way of the buffer member. Thus, abnormal noise or the like are less likely to be generated compared to when the contact element directly strikes the stopper.

In the opening/closing assist device, the cam follower may be rod-shape and have a diameter that gradually increases from two ends toward the middle, and the cam follower may be inserted to the groove so that a center axis of the cam follower is parallel to the rotation axis of the cam.

In this structure, even if the cam is tilted relative to the cam follower due to a coupling error or the like, the outer circumferential surface of the curved cam follower contacts the inner surface of the groove in a preferred manner. Thus, the opening/closing operability of the opening/closing body is maintained in a preferred manner.

EMBODIMENTS OF THE INVENTION

First Embodiment

A first embodiment of an opening/closing assist device of an opening/closing body will now be described with reference to FIGS. 1 to 10.

<Schematic Structure of Opening/Closing Assist Device>

Figure 1:
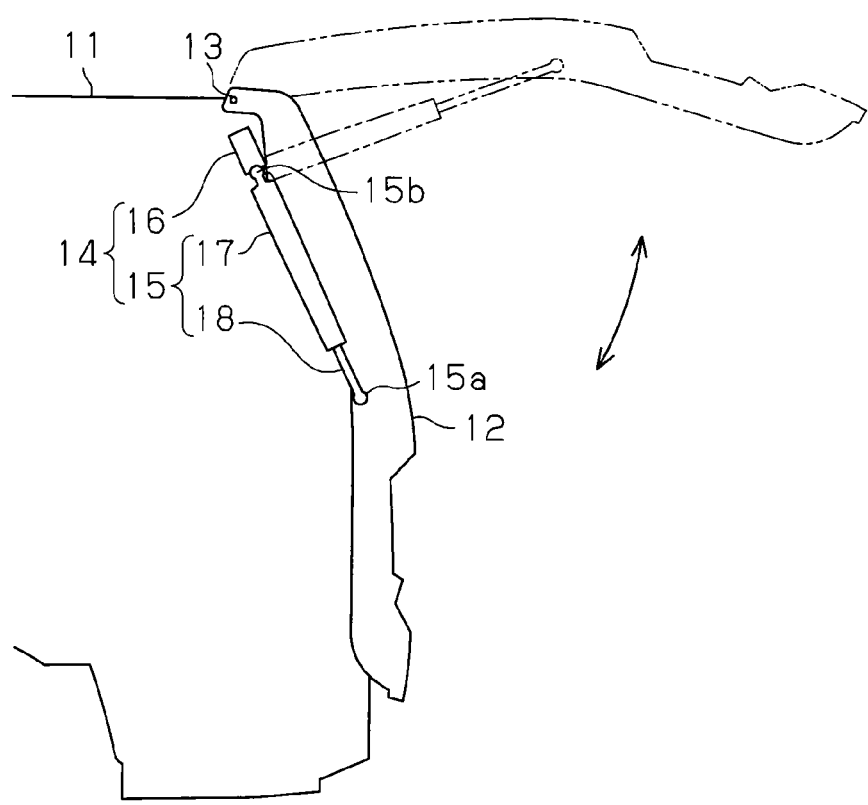
FIG. 1 is a side view of a rear door to which a first embodiment of an opening/closing assist device is applied.

As shown in FIG. 1, a rear door 12 is arranged at a rear section of a vehicle body 11. The rear door 12 is rotatable in a vertical direction about a support point 13, which is located at an upper section of the vehicle body 11. The support point 13 corresponds to a rotation axis horizontally extending along a vehicle width direction. Left and right (only one side shown) opening/closing assist devices 14 are arranged between the vehicle body 11 and the rear door 12 to assist the operation force required for the opening and closing of the rear door 12. Each opening/closing assist device 14 includes a damper stay 15 and a slide mechanism 16.

The damper stay 15 of each opening/closing assist device 14 is arranged between one of the two sides of the rear section of the vehicle body 11 in the vehicle width direction (direction in which the rotation axis of the rear door 12 extends) and one of the two sides of the rear door 12 in the vehicle width direction. The damper stay 15 includes a cylinder 17 and a piston rod 18. The piston rod 18 is irremovably inserted into the cylinder 17 with a compression coil spring (not shown). The elastic force of the compression coil spring causes the piston rod 18 to be constantly biased in a direction in which the piston rod 18 projects out of the cylinder 17.

A first end 15a (door side coupling point) of the damper stay 15, that is, a distal end of the piston rod 18 is pivotally coupled to the rear door 12. A second end 15b (vehicle body side coupling point) of the damper stay 15, that is, a basal end of the cylinder 17 is coupled to the vehicle body 11 by the slide mechanism 16. The slide mechanism 16 allows the second end 15b of the damper stay 15 to be movable in the vertical direction along a rear surface of the vehicle body 11.

<Slide Mechanism>

The slide mechanism 16 will now be described.

Figure 2:
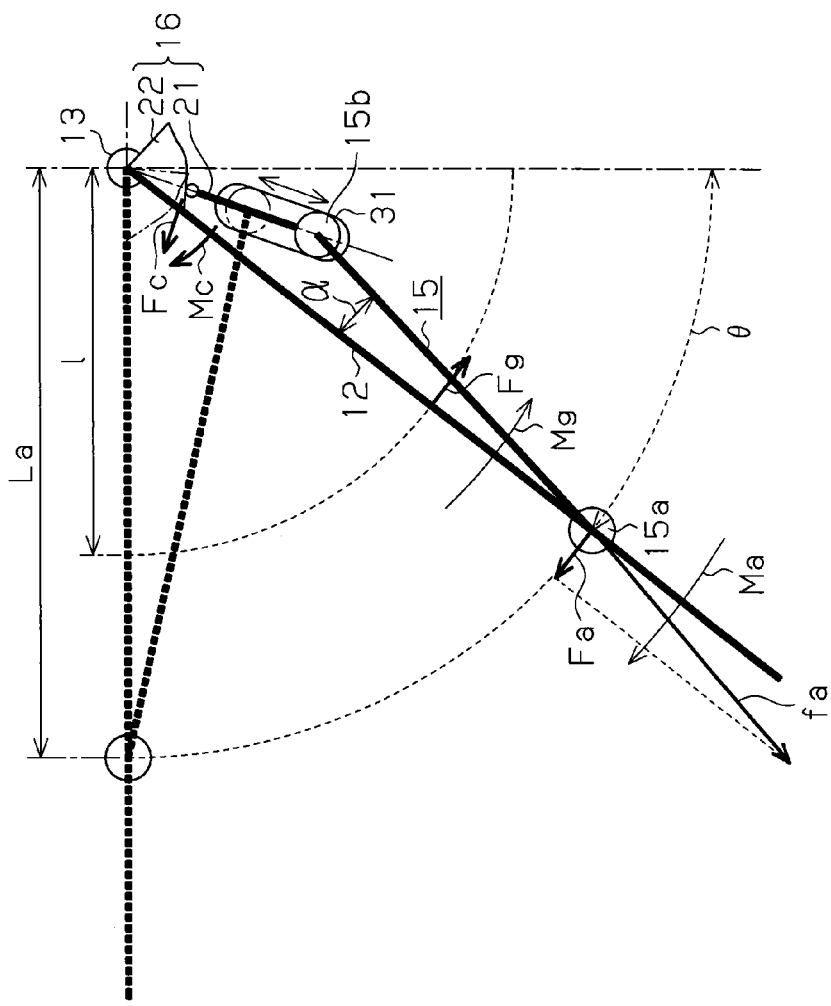
FIG. 2 is a schematic diagram showing the structure of a first embodiment of the opening/closing assist device.

As shown in FIG. 2, the slide mechanism 16 includes a rod 21 and a cam 22. The second end 15b (vehicle body side coupling point) of the damper stay 15 is rotatably coupled to the vicinity of the first end of the rod 21. The rod 21 is guided by a guiding member 31 arranged on the vehicle body 11 and is able to linearly move back and forth. The guiding member 31 is arranged on the rear surface of the vehicle body 11 and guides the vertical movement of the rod 21 along the rear surface of the vehicle body 11.

Figure 3:
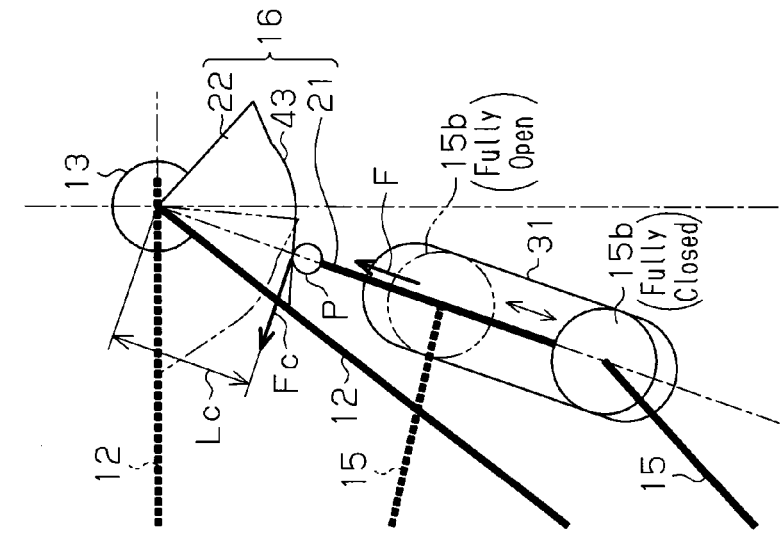
FIG. 3 is a schematic diagram showing the structure of a slide mechanism in the opening/closing assist device of FIG. 2.

As shown in FIG. 3, the cam 22 is fixed to the rear door 12 at the vicinity of the support point 13. The cam 22 has a sectoral shape. The cam 22 is arranged so that the center of the sectoral shape is directed toward the support point 13 and a cam surface 43, which is a curved surface of the sectoral shape, is directed toward the rod 21. In the cam surface 43, the central portion and the end portions with respect to the rotation direction of the cam 22 have different shapes. The central portion and the end portions of the cam surface 43 are smoothly connected. As will be described in detail later, the cam surface 43 corresponds to the inner surface of an elongated hole 42 (see FIG. 7) formed in the cam 22, and more specifically, corresponds to an inner cam surface 43, which is the inner surface at the side closer to the support point 13.

A second end (specifically, cam follower 41 to be described later) of the rod 21 is constantly pushed against the cam surface 43 by the elastic force of the damper stay 15. The cam 22 rotates integrally with the rear door 12. The second end of the rod 21 slides along and contacts the cam surface 43 as the cam 22 rotates. The rod 21 and, consequently, the second end 15b, which is the vehicle body side coupling point of the damper stay 15, move while being guided by the guiding member 31 in correspondence with the undulation of the cam surface 43. The second end 15b of the damper stay 15 is moved between a fully closed position, which is shown by the solid line in FIG. 3, and a fully open position, which is shown by the double-dashed line in FIG. 3.

<Shape of Cam Surface>

The shape of the cam surface 43 will now be described. The shape of the cam surface 43 is set so that the desired operation characteristics correspond to a moment M (operation force) required to rotate the rear door 12. Here, the adjustment of the operation force required to open and close the rear door 12 to be close to zero will be described as the desired operation characteristics. The following description will refer to FIG. 2.

The moment M is expressed with following equation (A).

$$M = Mg - Ma - Mc \quad (A)$$

Here, "Mg" is the moment resulting from the weight of the rear door 12, "Ma" is the assist moment resulting from the elastic force of the damper stay 15, and "Mc" is the assist moment resulting from the reaction force Fc of the cam 22. These forces all act on the rear door 12.

As shown in FIG. 2, for example, if a perpendicular line segment extending through the support point 13 is the fully closed position of the rear door 12, when the open degree of the rear door 12 from the fully closed position is open degree θ, the weight moment Mg acts in the closing direction of the rear door 12. The two assist moments Ma and Mc respectively act in the opening direction of the rear door 12.

The weight moment Mg is expressed with the following equation (B).

$$Mg = Fg \times l = m \times g \times \sin\theta \times l \quad (B)$$

Here, "Fg" is the weight of the rear door 12, "m" is the mass of the rear door 12, "g" is the gravitational acceleration, and "l" is the distance between the center of gravity of the rear door 12 and the support point 13.

The weight moment Mg of the rear door 12 is determined by the mass of the rear door 12, the distance between the center of gravity of the rear door 12 and the support point 13, and the open degree of the rear door 12.

The weight moment Mg is constant at each open degree. Thus, the assist moment Ma and the assist moment Mc resulting from the cam reaction force are adjusted to satisfy the following equation (C) at each open degree of the rear door 12.

$$Mg - Ma - Mc \approx 0 \quad (C)$$

The assist moment Ma is expressed with the following equation (D).

$$Ma = Fa \times La = fa \times \sin\alpha \times La \quad (D)$$

Here, Fa is the opening direction component with respect to the rear door 12 of the elastic force of the damper stay 15, that is, the force acting in the tangential direction with respect to an arcuate trajectory of when the rear door 12 is moved in the opening direction. La is the distance (length of the arm of the assist moment Ma) of the support point 13 and the first end 15a, which is the door side coupling point, of the damper stay 15.

Furthermore, fa is the elastic force of the damper stay 15, and a is an angle formed by a line, which connects the support point 13 and the first end 15a of the damper stay 15, and an axis of the damper stay 15. Here, a is determined in accordance with the position of the first end 15a of the damper stay 15, and the position of the first end 15a of the damper stay 15 is determined in accordance with the shape (undulation) of the cam surface 43. In other words, the assist moment Ma can be adjusted by the shape (undulation) of the cam surface 43.

The reaction force Fc of the cam 22 is the force that is generated as a counteraction to the force at which the rod 21 is pushed against the cam surface 43 by the elastic force of the damper stay 15, and is the component acting in the opening/closing direction of the rear door 12. The assist moment Mc, which results from the cam reaction force, is the force with which the reaction force Fc of the cam 22 rotates the cam 22.

The assist moment Mc resulting from the reaction force Fc of the cam 22 is expressed with the following equation (E).

$$Mc = Fc \times Lc = F \times \tan(\theta c - \rho) \times Lc \tag{E}$$

Figure 4:
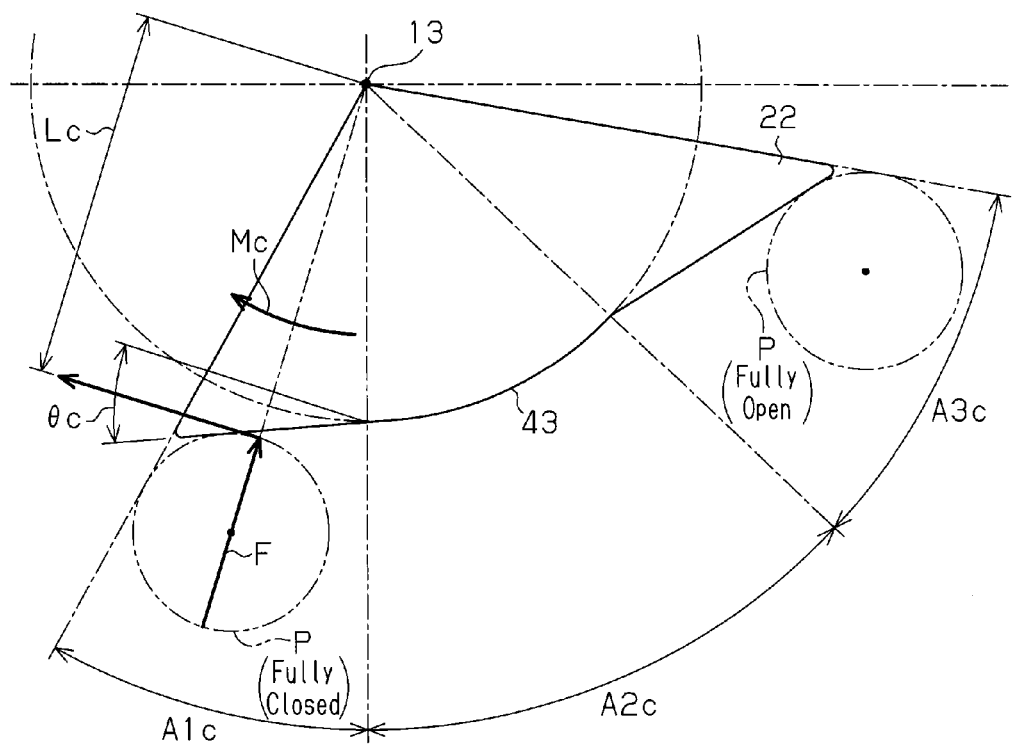
FIG. 4 is a front view of a cam showing the shape of a cam surface in the slide mechanism of FIG. 3.

Here, Lc is the length of the arm of the moment, that is, the distance between the support point 13, which is the rotation center of the cam 22, and a contacting point P with the rod 21 in the cam surface 43 (see FIG. 3). In FIGS. 2 and 3, the center of the sectoral shape of the cam 22 and the support point 13 are coincided for the sake of convenience. Furthermore, F is the pushing force on the cam surface 43 of the rod 21. The pushing force F is determined based on the elastic force of the damper stay 15. Furthermore, as shown in FIG. 4, θc is the contact angle of the cam 22, and ρ is the friction angle (coefficient determined by the friction that occurs between the cam 22 and the rod 21). The contact angle θc is an angle formed by a tangential line at the contacting point P with the rod 21 in the cam surface 43 and a line orthogonal to a direction the pushing force F, which is based on the elastic force of the damper stay 15, acts on the rod 21.

The length Lc of the arm of the moment and the contact angle θc of the cam 22 are determined by the shape (undulation) of the cam surface 43. In other words, the assist moment Mc resulting from the cam reaction force can be adjusted by the shape (undulation) of the cam surface 43.

Therefore, by controlling the shape of the cam surface 43, it is theoretically possible for the sum of the assist moments (Ma and Mc) acting in the direction for assisting the opening and closing of the rear door 12 in the opening operation or the closing operation to be equalized with the weight moment Mg of the rear door 12.

The opening/closing operation characteristics required for the rear door 12 varies in accordance with the vehicle type, specification, and the like. In other words, the desired operation characteristics includes not only the operation characteristics for adjusting the operation force required to open and close the rear door 12 close to zero as described above, but also the operation characteristics for assisting full closing when the rear door is near the fully closed position and assisting full opening when the rear door is near the fully open position. Such properties can all be obtained by setting the shape of the cam surface 43.

<Specific Structure of Slide Mechanism>

The specific structure of a slide mechanism 16 will now be described.

Figure 5:
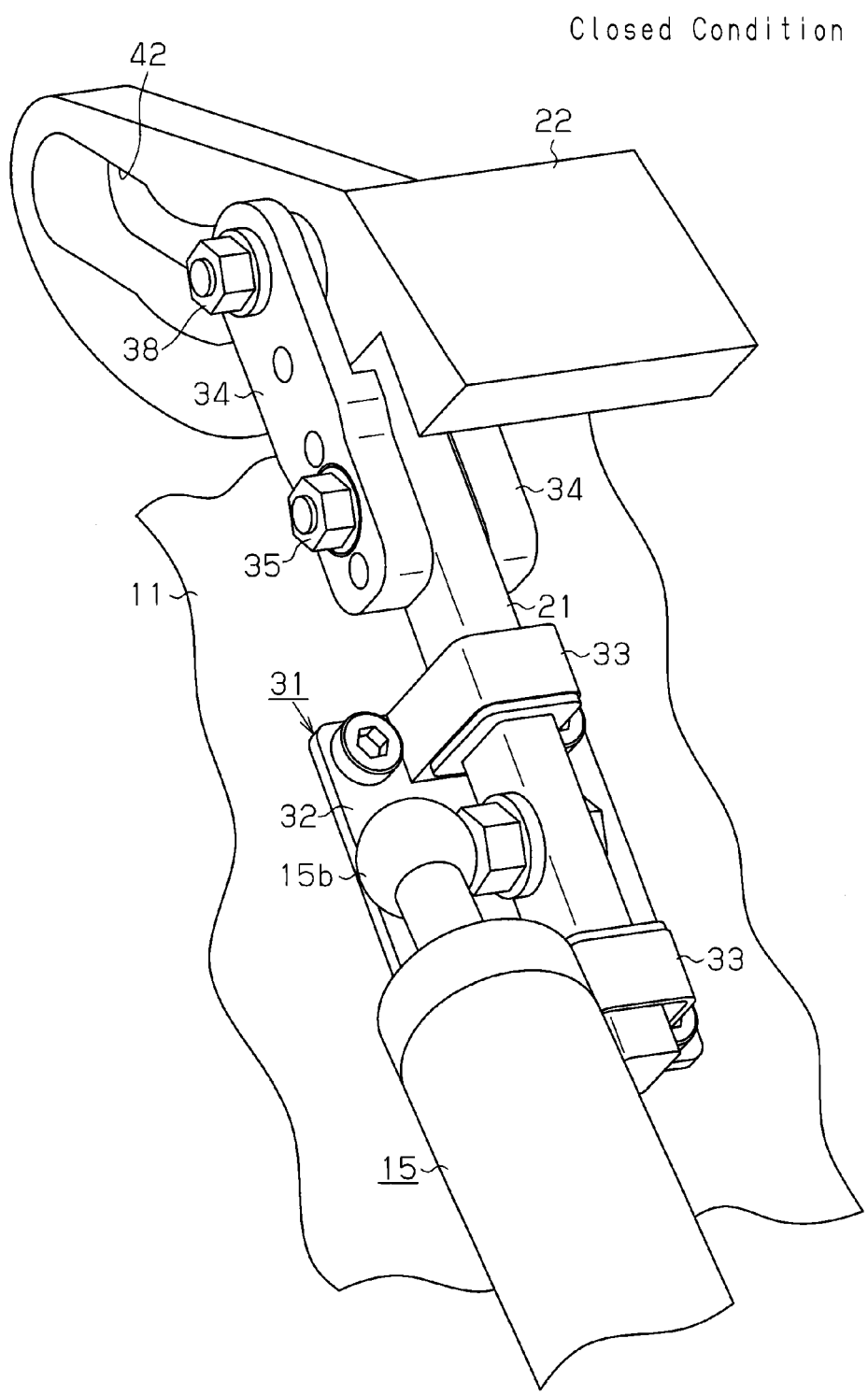
FIG. 5 is a perspective view showing the slide mechanism and the cam of FIG. 3 coupling to each other.

As shown in FIG. 5, the slide mechanism 16 includes a quadrangular prism shaped rod 21 and a cam 22. The rod 21 is attached to the guiding member 31, which is fixed to the vehicle body 11 (more precisely, upper section of rear surface). The guiding member 31 includes a fixing plate 32, which is fixed to the vehicle body 11, and two guiding frames 33, 33, which have a square frame shape and are arranged on the upper surface of the fixing plate 32. The guiding frames 33, 33 are respectively fixed to the upper section and the lower section of the surface of the fixing plate 32. The rod 21 is inserted in a slidable manner into the two guiding frames 33, 33. The rod 21 can move straight back and forth in the direction the two guiding frames 33, 33 are aligned. The second end 15b (vehicle body side coupling point) of the damper stay 15 is rotatably coupled to a portion between the two guiding frames 33, 33 in the rod 21 (more precisely, side surface on the outer side in the vehicle width direction).

Figure 6:
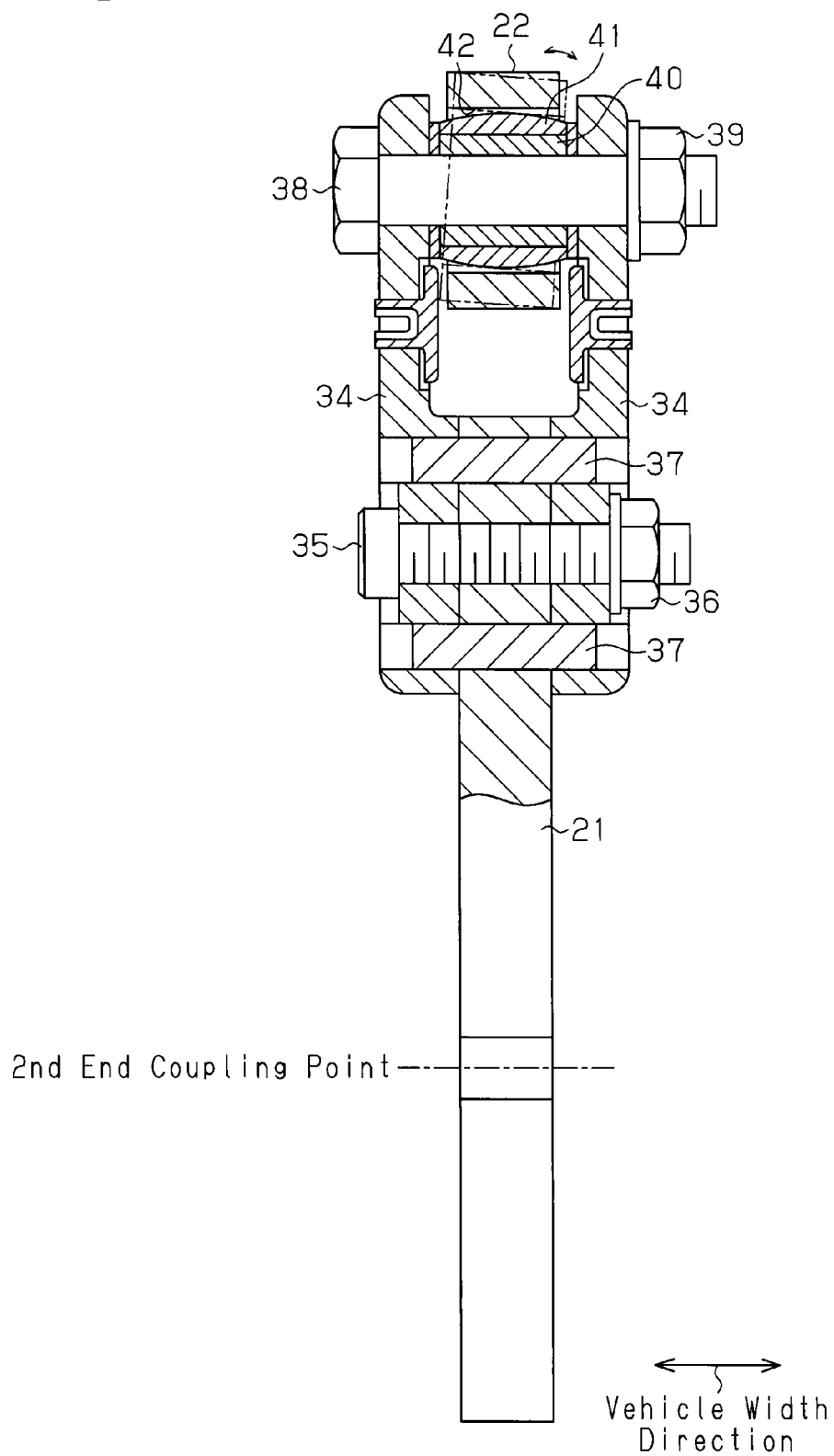
FIG. 6 is a cross-sectional view of the slide mechanism and the cam of FIG. 5.

As shown in FIG. 6, two arms 34, 34 are coupled to the rod 21 above the guiding member 31. The two arms 34, 34 sandwich the rod 21 in the vehicle width direction. Basal ends of the two arms 34, 34 are coupled to the rod 21 by a bolt 35 extending in the vehicle width direction and a nut 36 fastened to the bolt 35. Two pins 37, 37 are fitted to the two arms 34, 34 from the vehicle width direction. The pins 37, 37 extend through the rod 21. The two pins 37, 37 are arranged at positions of sandwiching the bolt 35 in the axial direction of the rod 21. Distal ends of the two arms 34, 34 are coupled to each other with a bolt 38 extending in the vehicle width direction and a nut 39 screw fitted to the bolt 38.

A bearing 40 and the cam follower 41 attached to the bearing 40 are arranged between the distal ends of the two arms 34, 34. The cam follower 41 is rotatable relative to the bolt 38 due to the bearing 40. The cam follower 41 is drum-shaped. In other words, the cam follower 41 has an outer diameter set to gradually increase from the two both ends toward the middle in the axial direction. The outer circumferential surface of the cam follower 41 has a curved shape.

The arms 34, 34 serve as parts of the rod 21. Therefore, the distal ends of the arms 34, 34 correspond to the second end of the rod 21.

Figure 7:
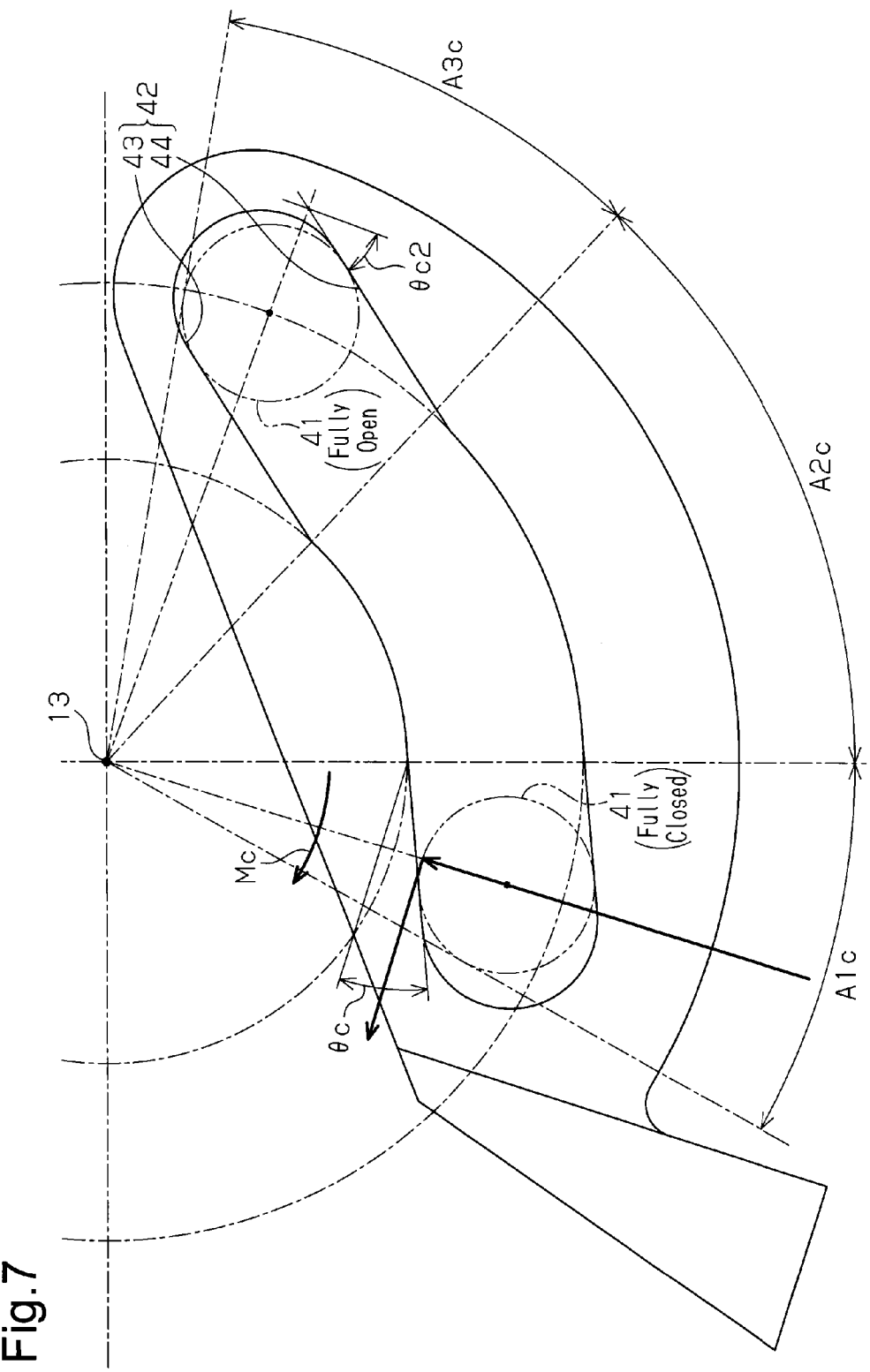
FIG. 7 is a front view taken from a vehicle width direction of the cam of FIG. 5.

As shown in FIG. 7, the cam 22 includes the elongated hole 42. The elongated hole 42 is curved to be concave toward the opening direction of the rear door 12. The cam follower 41 is inserted to the elongated hole 42. The center axis of the cam follower 41 is parallel to the support point 13, which is also the rotation axis of the cam 22. The cam follower 41 rolls inside the elongated hole 42 when the cam 22 rotates.

As described above, the cam 22 is fixed to the rear door 12 in the vicinity of the support point 13. The curved elongated hole 42 is arranged so that the concave side faces the support point 13. The inner surface of the elongated hole 42 functions as the cam surface. In the elongated hole 42, the inner surface on the side close to the support point 13 is an inner cam surface 43, and the inner surface on the side distant from the support point 13 is an outer cam surface 44.

As described above, the inner cam surface 43 corresponds to the cam surface 43 shown in FIG. 4. The elongated hole 42 includes first to third cam regions A1c to A3c. The cam follower 41 is constantly pushed against either one of the inner cam surface 43 and the outer cam surface 44 by the elastic force of the damper stay 15.

<Operation Characteristics>

Figure 8:
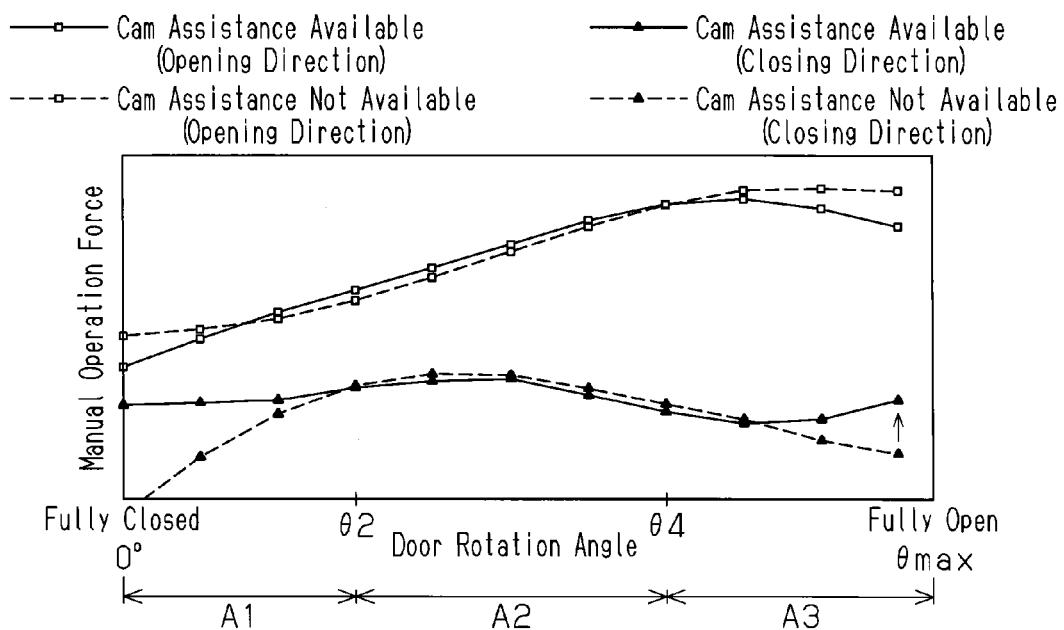
FIG. 8 is a graph showing the opening/closing operation characteristics of the rear door.

In the present example, the shape of the elongated hole 42 can be set to obtain the operation characteristics shown in FIG. 8 as the desired operation characteristics. The horizontal axis in the drawing indicates the open degree θ of the rear door 12, and the vertical axis indicates the operation force required to operate the rear door 12. An opening initiation region in which the open degree θ of the rear door 12 is 0° to θ2 is defined as a first opening region A1, an intermediate region in which the open degree θ of the rear door 12 is θ2 to θ4 is defined as a second opening region A2, and an opening termination region in which the open degree θ of the rear door 12 is θ4 to θmax is defined as a third opening region A3.

The cam 22 rotates integrally with the rear door 12. Thus, the elongated hole 42 is also divided in accordance with the open degree θ of the rear door 12. More specifically, as shown in FIG. 7, a region in which the cam follower 41 slides when the open degree θ is the first opening region A1 is defined as a first cam region A1c, a region in which the cam follower 41 slides when the open degree θ is the second opening region A2 is defined as a second cam region A2c, and a region in which the cam follower 41 slides when the open degree θ is the third opening region A3 is defined as a third cam region A3c.

As shown in FIG. 7, the first cam region A1c of the elongated hole 42 is linearly formed so that the distance from the support point 13 gradually decreases from the fully closed position to the fully open position (i.e., the inner cam surface 43 and the outer cam surface 44 are formed to be planar). The second cam region A2c of the elongated hole 42 is formed to be curved, specifically, arcuate so that the distance from the support point 14 is smaller than the first cam region A1c and constant irrespective of the rotation angle of the cam 22 (i.e., the inner cam surface 43 and the outer cam surface 44 are formed to be curved, specifically, arcuate). The third cam region A3c of the elongated hole 42 is linearly formed so that the distance from the support point 13 gradually increases at the same rate as the first cam region A1c from the fully closed position to the fully open position (i.e., the inner cam surface 43 and the outer cam surface 44 are formed to be planar).

Thus, the assist moment Mc resulting from the cam reaction force when the second end (cam follower 41 to be exact) of the rod 21 exists in the first cam region A1c and when the second end of the rod 21 exists in the third cam region A3c is greater than the assist moment Mc when the second end of the rod 21 exists in the second cam region A2c. In other words, when starting the opening and finishing the opening of the rear door 12, a larger cam reaction force resulting from the assist moment Mc is applied to the rear door 12. The operation characteristics shown in FIG. 8 are obtained by setting the shape of the elongated hole 42 in such a manner.

<Operation of Opening/Closing Assist Device>

The operation of the opening/closing assist device having the above structure will now be described. The operation force on the rear door 12 is applied to the end of the rear door 12 located at the opposite side of the support point 13 by the user.

<Fully Closed Position to Fully Open Position>

When moving the rear door 12 from the fully closed position to the fully open position, the two assist moments Ma and Mc act on the rear door 12. In other words, the operation force applied by the user to open the rear door 12 is assisted by the two assist moments Ma and Mc.

As the open degree $\theta$ of the rear door 12 increases, the piston rod 18 extends and the elastic force of the damper stay 15 gradually decreases. The assist moment Ma corresponding to the angle $\alpha$ formed by the axis of the damper stay 15 and the rear door 12 is applied to the rear door 12.

As the open degree $\theta$ (rotation angle) of the rear door 12 increases, the cam 22 rotates in the same direction as the rear door 12. The assist moment Mc resulting from the cam reaction force is large when the open degree $\theta$ is in the first and third opening regions A1 and A3 compared to when the open degree $\theta$ is in the second opening region A2.

In other words, when the second end of the rod 21 (more precisely, the cam follower 41) slides in the first and third cam regions A1c and A3c of the elongated hole 42, the assist moment Mc is greater than when the second end of the rod 21 slides in the second cam region A2c is obtained. In other words, the operation force used to open the rear door 12 receives more assistance when starting the opening and when finishing the opening of the rear door 12. This allows the rear door 12 to open with an extremely light operation force.

As shown by the broken lines connecting the squares in the graph of FIG. 8, when the assist moment Mc resulting from the cam 22 does not exist, that is, when the second end 15b (vehicle body side coupling point) of the damper stay 15 does not slide, the operation force gradually increases as the open degree $\theta$ of the rear door 12 increases. In contrast, as shown by the solid line connecting the squares in the graph, when the assist moment Mc resulting from the cam 22 exists, in particular, the operation force in the first and third opening regions A1, A3 corresponding to when starting the opening of the rear door 12 is apparently smaller than when the assist moment Mc does not exist. The operation force in the second opening region A2 is maintained to be about the same as that when the assist moment Mc does not exist.

As the contact angle $\theta c$ of the cam 22 increases, the reaction force Fc of the cam 22 and, consequently, the assist moment Mc increase. Hence, the rear door 12 can be opened with a small force. As the contact angle $\theta c$ decreases, the reaction force Fc of the cam 22 and, consequently, the assist moment Mc decreases. Hence, the rear door 12 becomes difficult to open. This is also apparent from equation (E).

<Fully Open Position>

The rear door 12 reaching the fully open position is held at the fully open position by the two assist moments Ma and Mc. The piston rod 18 is extended by the maximum amount when the rear door 12 is at the fully open position. As the extended amount of the piston rod 18 increases, the elastic force of the compression coil spring incorporated in the cylinder 17 decreases. The decrease in the assist moment Ma of the damper stay 15 is compensated for by the assist moment Mc resulting from the cam 22. When the open degree $\theta$ is in the third opening region A3, the assist moment Mc resulting from the extremely large cam reaction force is applied to the rear door 12. This holds the rear door 12 at at the fully open position in a preferable manner.

<Fully Open Position to Fully Closed Position>

When closing the rear door 12 at the fully open position, the opening/closing assist device 14 operates in a manner reversed from when opening the rear door 12.

The rear door 12 reaches the fully closed position by applying operation force to the rear door 12 in the closing direction. In this case, when the open degree $\theta$ is in the first and third opening regions A1 and A3, the assist moment Mc resulting from an extremely large cam reaction force is applied to the rear door 12. The assist moment Mc acts in the opening direction of the rear door 12. Thus, as shown by the solid line connecting the black triangles in the graph of FIG. 8, the operation force required for the user becomes substantially constant when closing the rear door 12.

The broken lines connecting the black triangles in the graph of FIG. 8 indicate the operation force required to close the rear door 12 when an assist moment Mc resulting from the cam 22 does not exist. As shown in the graph, the required operation force gradually increases as the open degree $\theta$ decreases from the third opening region A3 to the vicinity of the middle of the second opening region A2. The required operation force gradually decreases as the open degree $\theta$ decreases from the vicinity of the middle of the second opening region A2 to the first opening region A1.

In other words, although the force for holding the rear door 12 at the fully open position is small, the operation force increases when closing the rear door 12. The operation force decreases again as the fully closed position becomes closer. Thus, the operation force required to close the rear door 12 greatly changes from when starting the closing to when finishing the closing.

In this regard, in the present example, the operation force required for the user becomes substantially constant when closing the rear door 12, as described above. This improves the operability for closing the rear door 12 since the change in the operation force required when closing the rear door 12 is small.

Figure 9:
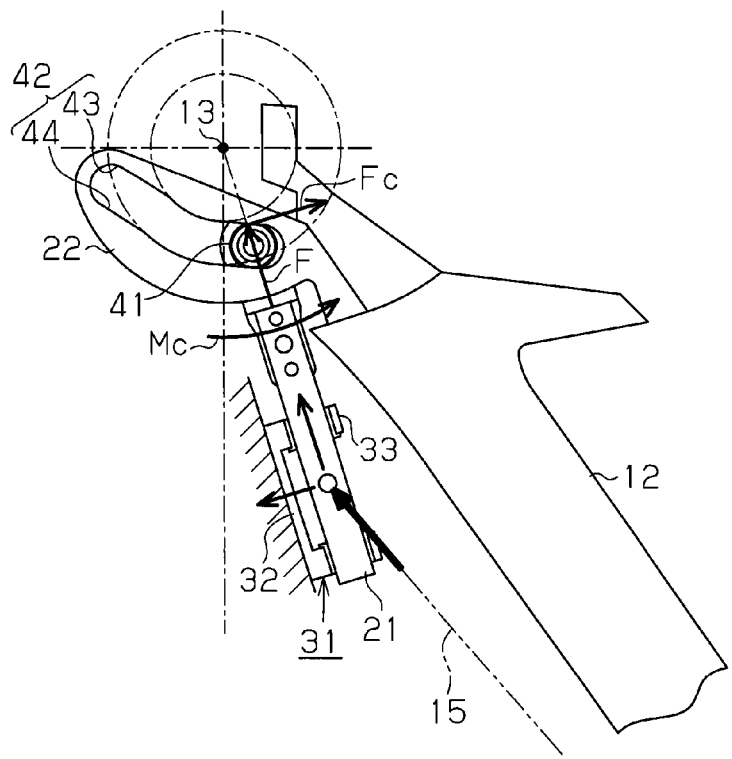
FIG. 9 is a side view taken from the vehicle width direction of the slide mechanism when the rear door is in a fully closed position.

When opening the rear door 12 at the fully closed position shown in FIG. 9, the operation force when the rear door 12 starts to open is assisted by the assist moment Mc resulting from the cam reaction force, as shown in the graph of FIG. 8. When the rear door 12 reaches the fully open position, the fully open position of the rear door 12 is assisted by the assist moment Mc resulting from the cam reaction force. When closing the rear door 12, the operation force required for the user becomes substantially constant when closing the rear door 12, as shown in the graph of FIG. 8.

Figure 10:
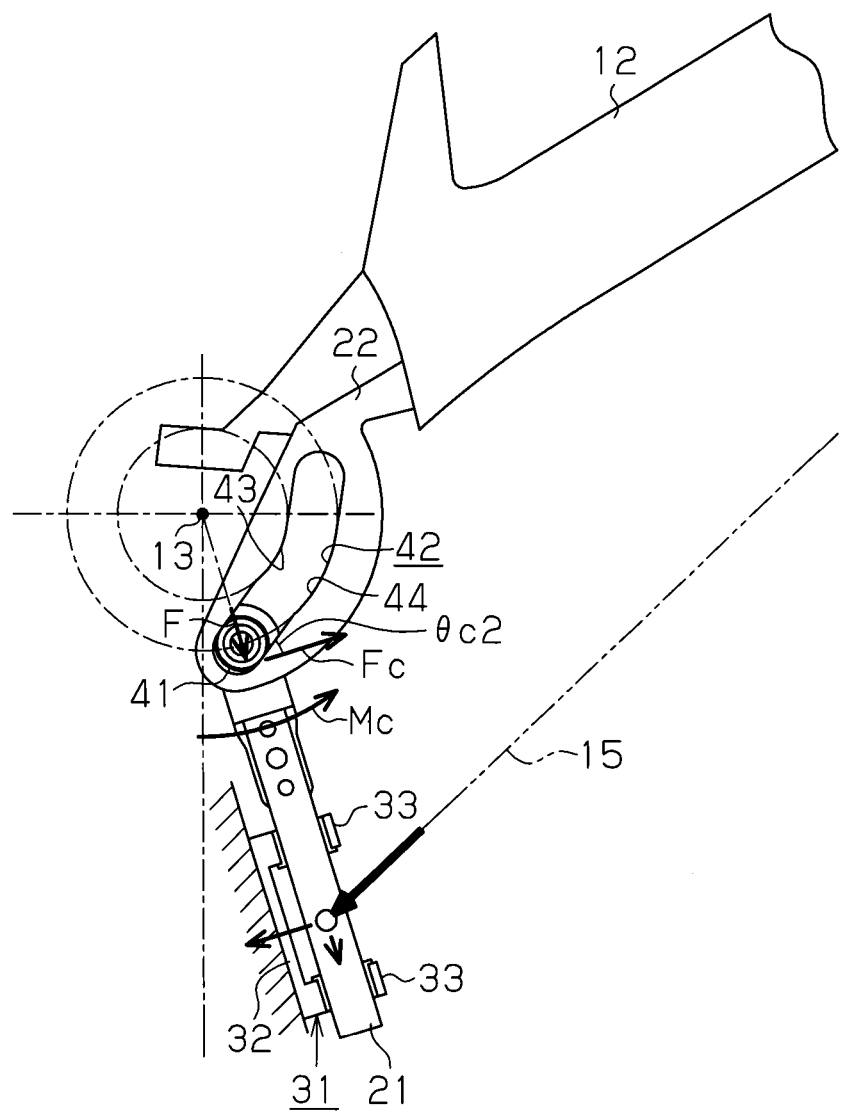
FIG. 10 is a side view taken from the vehicle width direction of the slide mechanism when the rear door is in a fully open position.

However, depending on the supporting condition and the like of the rear door 12, the pushing force F based on the elastic force of the damper stay 15 may act in a direction reversed upside down in the middle of the opening and closing of the rear door 12, and the pushing force F may act toward the lower side. For example, the rear door 12 may widely open toward the upper side as shown in FIG. 10. The cam follower 41 is pushed against the outer cam surface 44. The cam follower 41 is not separated from the cam 22 as long as the inner surface of the elongated hole 42 is used as the cam surface. Even if the pushing force F is directed toward the lower side, the assist moment Mc resulting from the cam 22 acts in the opening direction of the rear door 12. In other words, the assist moment Mc supplements the force holding the rear door 12, which widely opens toward the upper side, at the fully open position.

In the example shown in FIG. 10, the force holding the rear door 12 at the fully open position can be adjusted by controlling the shape of the cam surface.

In other words, as shown in FIG. 7, the force holding the rear door 12 at the fully open position increases as the contact angle θc2 of the cam follower 41 and the outer cam surface 44 increases. This is because the reaction force of the cam 22 increases. The force holding the rear door 12 decreases as the contact angle θc2 decreases. The contact angle θc2 is an angle formed by a tangential line, at a contact point of the cam follower 41 and the outer cam surface 44 when the rear door 12 is held at the fully open position, and a line, orthogonal to a direction the pushing force F based on the elastic force of the damper stay 15 acts on the cam follower 41.

Advantages of Embodiment

Accordingly, the present embodiment has the following advantages.

(1) The sum of the assist moments by the opening/closing assist device 14, that is, the two assist moments Ma and Mc and the weight moment Mg of the rear door 12 are balanced by setting the shape of the cam 22. This reduces the operation force required to open and close the rear door 12.

(2) The position of the second end 15b, which is the door side coupling point, of the damper stay 15 is controlled by the shape of the cam 22. Thus, the position of the door side coupling point corresponding to the open degree of the rear door 12 is fined adjusted. Furthermore, the desired operation characteristics are obtained by simply setting the shape of the cam surface 43.

(3) The slide mechanism 16 is formed by simple components such as the rod 21 and the cam 22 without using the drive source such as the motor. The slide mechanism 16 is also inexpensive since the number of components is small.

(4) The damper stay 15 uses the compression coil spring instead of a high pressure gas as a means for producing elastic force. The elastic force of the damper stay 15 thus does not depend on the temperature change. A stable elastic force is thus obtained.

(5) The size of the cam 22 is controlled by adjusting the length of the rod 21.

(6) The position of the second end 15b, which is the vehicle body side coupling point, of the damper stay 15 relative to the vehicle body 11 is easily controlled by setting the cam diameter.

(7) The cam follower 41 is inserted into the elongated hole 42, and the inner surface of the elongated hole 42 defines the cam surface. Thus, the cam follower 41 is not separated from the cam surface when opening and closing the rear door 12. Furthermore, the inner cam surface 43 and the outer cam surface 44 are effectively used regardless of whether the rear door 12 is in the fully closed position or the fully open position.

(8) The cam 22 is mounted on the rear door 12, and the slide mechanism 16 is mounted on the vehicle body 11. Thus, the relative position of the cam 22 and the slide mechanism 16 (rod 21, etc.) may change due to assembling errors, the occurrence of displacements when opening and closing the rear door 12, or the like. For example, the cam 22 may tilt to the left or the right, as shown by the double-dashed lines in FIG. 7. In this regard, by forming the cam follower 41 to be drum-shaped, the drum-shaped curved surface of the cam follower 41 and the inner surface of the elongated hole 42 would be in contact even if the cam 22 is tilted to the left or the right. The elastic force of the damper stay 15 is transmitted in a preferable manner to the cam 22 so that the opening/closing operability of the rear door 12 is improved.

(9) The rod 21 has a quadrangular prism shape. Thus, the rod 21 does not rotate about its own axis. Therefore, tilting is limited in the arm 34 and, consequently, the cam follower 41. The contact of the cam follower 41 and the inner surface of the elongated hole 42 may be maintained in a satisfactory manner.

Second Embodiment

A second embodiment of the present invention will now be described. The same reference numerals are given to those components that are the same as the corresponding components of the first embodiment. Such components will not be described in detail.

Figure 11:
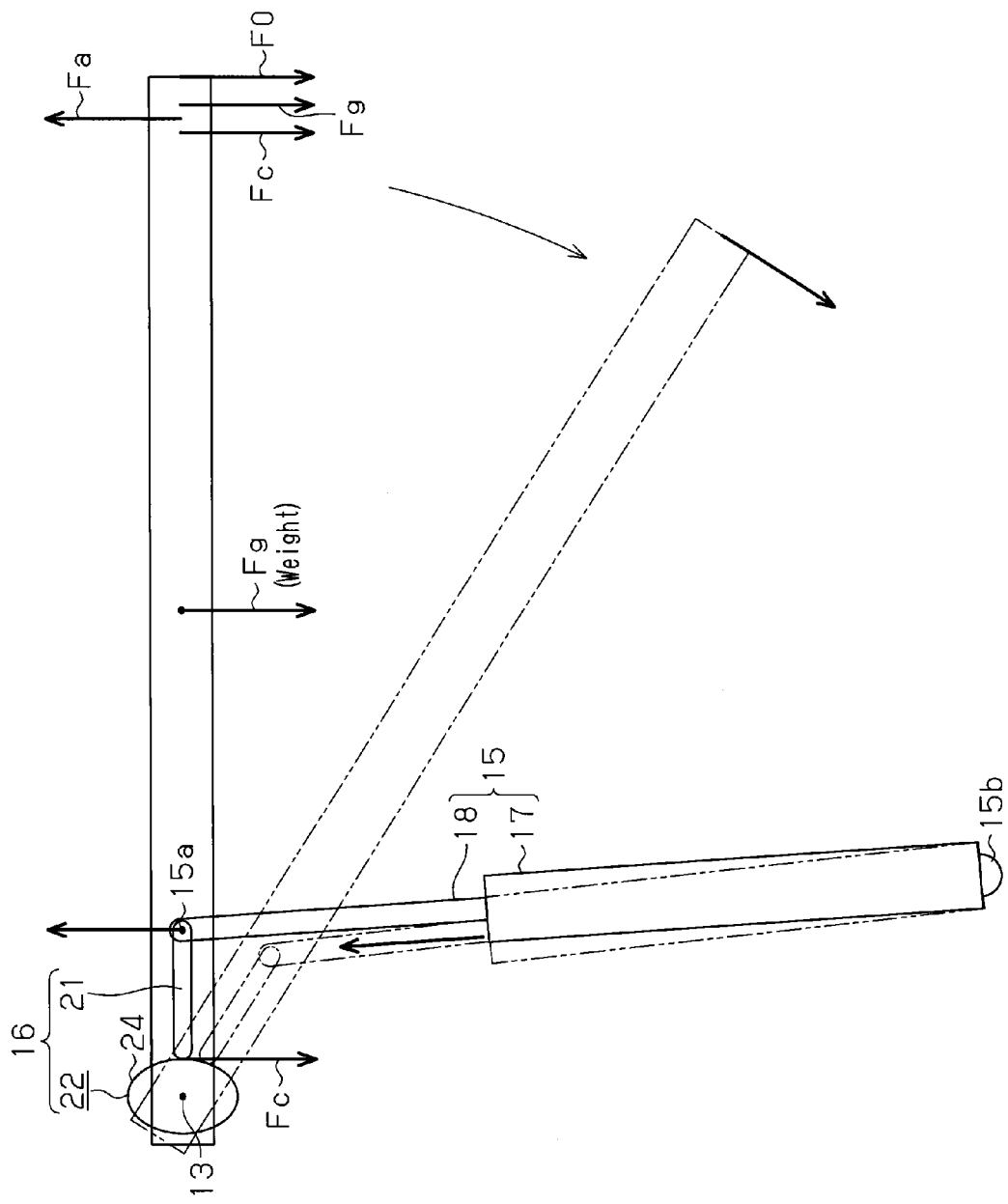
FIG. 11 is a schematic diagram showing the structure of a second embodiment of a rear door opening/closing assist device.

As shown in FIG. 11, the cam 22 is fixed to the vicinity of the support point 13 in the vehicle body 11. The layout of the door side coupling point and the vehicle body side coupling point of the damper stay 15 is reversed from the first embodiment. In other words, the first end 15a of the damper stay 15 is rotatably coupled to the first end of the rod 21 that moves straight back and forth along the rear door 12. The second end 15b of the damper stay 15 is pivotally coupled to the vehicle body 11. The second end of the rod 21 is constantly pushed against the cam surface 24 of the cam 22 by the elastic force of the damper stay 15 (more precisely, axial component of the rod 21). The distal end of the rod 21 slides relative to the cam surface 24 when the rear door 12 opens and closes.

The concept of balancing the weight moment of the rear door 12 and the assist moments with the opening/closing assist device 14 is the same as the first embodiment. Here, when closing the rear door 12, attention is given to the operation force F0 applied to the end (free end) of the rear door 12 located at the side opposite to the support point 13. The operation force F0 is expressed with the following equation (G). The equation (G) is analogous to the equation (A) described above.

$$F0 = Fa - Fc - Fg \qquad (G)$$

Here, "Fa" is a load that acts on the end of the rear door 12 due to the elastic force of the damper stay 15, "Fc" is a load that acts on the end of the rear door 12 due to the reaction force of the cam 22, and "Fg" is a load that acts on the end of the rear door 12 due to the weight of the rear door 12.

The present example also sets the shape of the cam surface 24 to realize the desired operation characteristics.

<Shape of Cam Surface>

Figure 12:
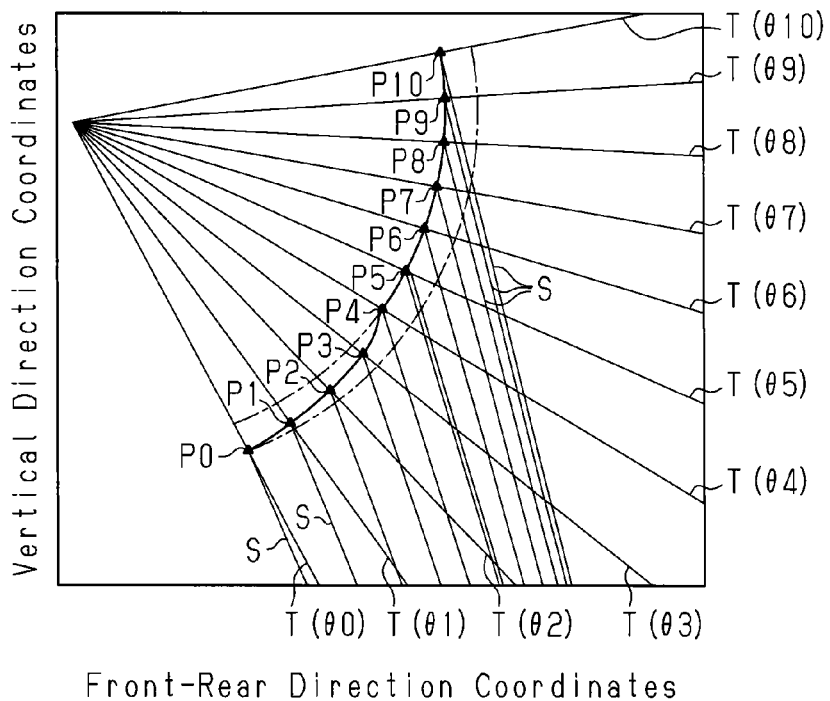
FIG. 12 is a chart showing the movement trajectory of a door side coupling point of a damper stay in the second embodiment.

Next, the shape of the cam surface 24 will be described. As shown in the chart of FIG. 12, the horizontal axis indicates coordinates in the front-rear direction of the vehicle body 11, and the vertical axis indicates coordinates in the vertical direction of the vehicle body 11. A plurality of line segments T shows the movement trajectory of the rear door 12 when the rear door 12 is moved by a constant open degree θ between the fully closed position and the fully open position about the support point 13, and a plurality of line segments S shows the movement trajectory of the damper stay 15. Each of intersections P0 to P10 of the line segment T and S is the movement trajectory of the first end 15a, which is the door side coupling point, of the damper stay 15. As shown in the drawing, the movement trajectory of the first end 15a obtained by smoothly connecting each of the intersections P0 to P10 has an arcuate shape. When the open degree θ at the fully closed position of the rear door 12 is open degree θ0, the trajectory radius of the first end 15a in the range from the open degree θ0 to the open degree θ3 is slightly larger than the trajectory radius of the first end 15a in the range from the open degree θ3 to the open degree θ10.

Figure 13:
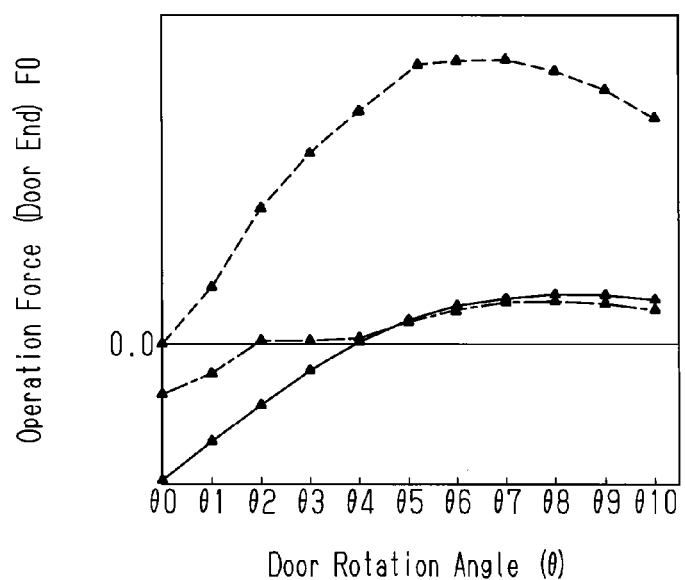
FIG. 13 is a graph showing the closing operation characteristics of the rear door in the second embodiment.

The shape of the cam surface 24 is a shape that is pursuant to the movement trajectory of the first end 15a. In other words, the cam diameter in the range from the open degree θ0 to the open degree θ3 is set to be greater than the cam diameter in the range from the open degree θ3 to the open degree θ10. The operation characteristics shown in the graph of FIG. 13 is obtained by setting the shape of the cam surface 24 in such a manner. The graph also shows the operation characteristics when closing the rear door 12.

In the graph of FIG. 13, the horizontal axis indicates the open degree θ of the rear door 12, and the vertical axis indicates the operation force required when closing the rear door 12.

As shown by the solid line connecting the black triangles in the graph, when the assist moment Mc resulting from the cam 22 does not exist, that is, when the first end 15a (door side coupling point) of the damper stay 15 does not slide, the operation force gradually decreases as the open degree θ decreases. The required operation force changes from a positive value to a negative value from the vicinity of the open degree θ4, which is where the rear door 12 is closed by about ⅔ of the fully opened open degree θmax.

On the other hand, as shown by the single-dashed line connecting the black triangles in the graph, when the assist moment Mc resulting from the cam 22 exists, the operation force gradually decreases as the open degree θ decreases and reaches the open degree θ even after reaching the vicinity of the open degree θ4. This is because the cam diameter of the portion corresponding to the open degree θ0 to the open degree θ4 is set to be greater than the portion corresponding to the other openings. In other words, the assist moment Mc resulting from the cam 22 increases in correspondence with the increase in the cam diameter.

When sliding the door side coupling point like in the present example, drops in the operation force at the open degree θ4 to the open degree θ0 are reduced. Thus, the change in the operation force required when closing the rear door 12 is small compared to when the door side coupling point does not slide. The operation force required to close the rear door 12 is uniform over the entire range from the fully open position to the fully closed position. This obtains a satisfactory operation feel. The required operation force is maintained at a low level approximate to 0 (zero) over the entire range from the fully open position to the fully closed position. Thus, the rear door 12 can be closed with a light and constant force.

A gas damper uses the elastic force of high pressure gas instead of a compression coil spring as the damper stay. If a gas damper is employed and the door side coupling point does not slide, the operation force required when closing the rear door 12 changes as shown by the broken line connecting the black triangles in FIG. 13. In other words, when the rear door 12 starts to close, the operation force gradually increases and becomes maximal in the vicinity of the open degree θ5, which is the middle position. Thereafter, the operation force gradually decreases as the open degree θ of the rear door 12 decreases. A great operation force is required in the middle of the closing of the rear door 12. Thus, a satisfactory operation feel is not obtained.

The properties of the gas damper change when the temperature changes. This is due to the change in the volume of the high pressure gas sealed in the cylinder. For example, if the elastic force of the gas damper is adjusted so that the rear door 12 can be held at the fully open position under a low temperature, the operation force required under a normal temperature or a high temperature would become large. In other words, the rear door 12 becomes difficult to open and close.

In this regard, if the damper stay that uses the elastic force of the compression coil spring is employed, the properties are less likely to be affected by temperature changes.

Advantage of Embodiment

Accordingly, the present embodiment obtains the same advantages as the first embodiment. In other words, the first end 15a, which is the door side coupling point, of the damper stay 15 slides in accordance with the open degree of the rear door 12. The length of the arm of the moment resulting from the cam reaction force during the sliding is adjusted to balance the weight moment Mg of the rear door 12 and the assist moments Ma and Mc produced by the opening/closing assist device 14. This allows for reduction in the operation force required to open and close the rear door 12 at each open degree θ of the rear door 12.

Third Embodiment

A third embodiment of an opening/closing assist device of an opening/closing body will now be described.

Figure 14:
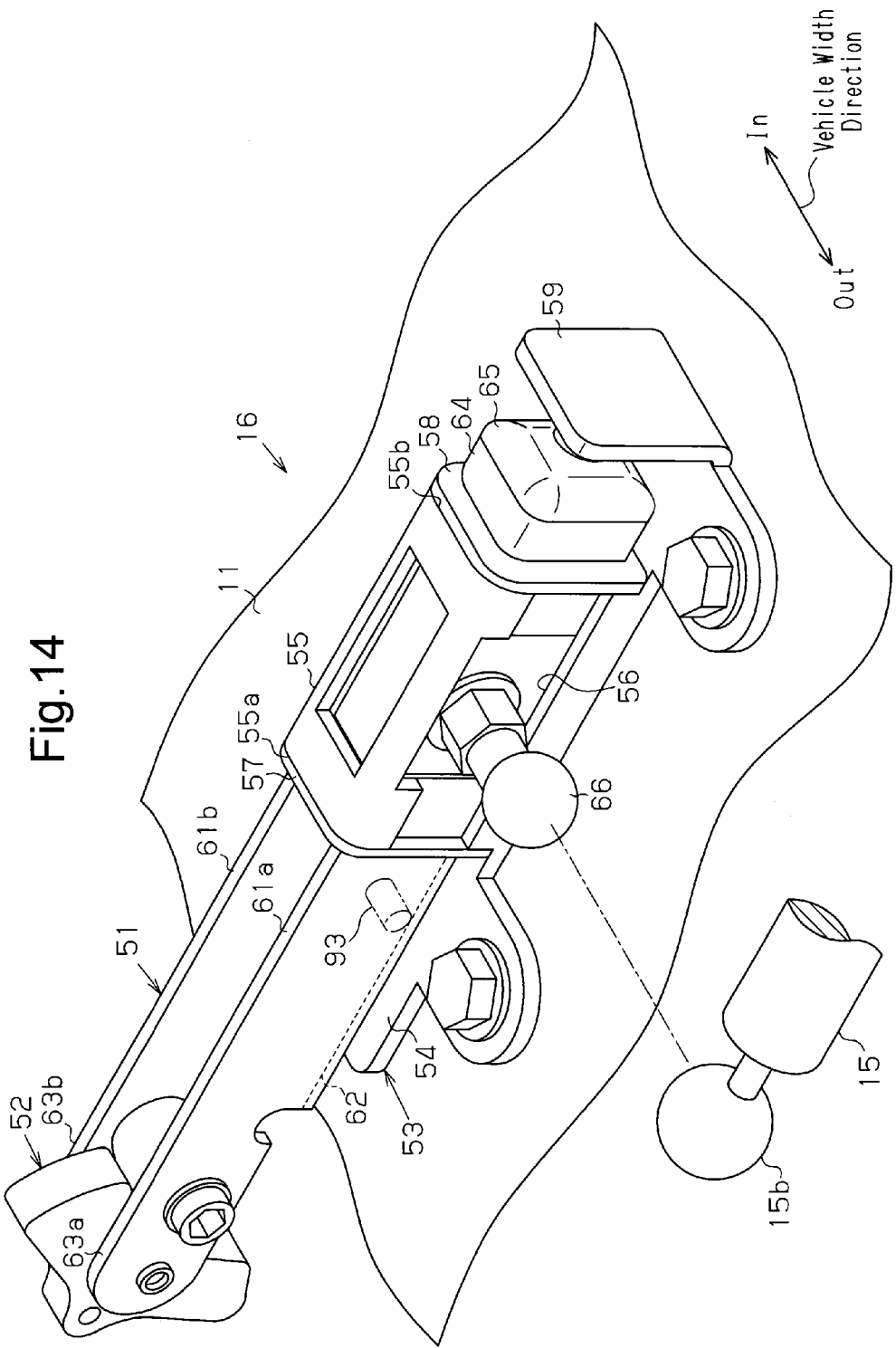
FIG. 14 is a perspective view showing a third embodiment of an opening/closing assist device.

As shown in FIG. 14, the slide mechanism 16 includes a rod 51 and a cam 52.

The rod 51 is attached to the guiding member 53, which is fixed to the vehicle body 11 (more precisely, upper section of the rear surface). The guiding member 53 is formed by bending a metal plate. The guiding member 53 includes a rectangular fixing plate 54, which is fixed to the vehicle body 11, and a polygonal tubular guiding frame 55, which is arranged on the upper surface of the fixing plate 54. An opening 56 is formed in an outer side wall in the vehicle width direction of the guiding frame 55. Polygonal tubular resin bushings 57 and 58 are respectively fitted to a first end 55a and a second end 55b in the axial direction of the guiding frame 55. A stopper 59 is arranged at a lower part (diagonally lower right end in FIG. 14) of the fixing plate 54. The stopper 59 faces the second end 55b of the guiding frame 55, more specifically, an open portion of the resin bushing 58.

The rod 51 is also integral and formed by bending a metal plate. The rod 51 includes two side walls 61a and 61b facing each other in the vehicle width direction and a bottom wall 62 coupling the side walls 61a and 61b. Further, the rod 51 is formed to be box-shaped as a whole. The two side walls 61a and 61b have first ends (diagonally upper left ends in FIG. 14)

that extend from the bottom wall 62 in the direction it extends to function as arms 63a and 63b that sandwich the cam 52. The second ends (diagonally lower right ends in FIG. 14) of the two side walls 61a and 61b include a box-shaped tubular portion 64. A lid 65 is attached to the tubular portion 64. Furthermore, a coupling portion 66 of the damper stay 15 is arranged at a portion closer to the tubular portion 64 in the side wall 61a on the outer side in the vehicle width direction of the two side walls 61a and 61b. The coupling portion 66 is rod-shaped.

The rod 51 having the structure described above slides into the guiding frame 55 through the two resin bushings 57 and 58. The rod 51 moves straight back and forth in the direction in which the two resin bushings 57 and 58 are aligned. The lid 65 of the rod 51 faces the stopper 59. The coupling portion 66 of the rod 51 projects out of the opening 56 of the guiding frame 55. The second end 15b (vehicle body side coupling point) of the damper stay 15 is rotatably coupled to the coupling portion 66.

Figure 15:
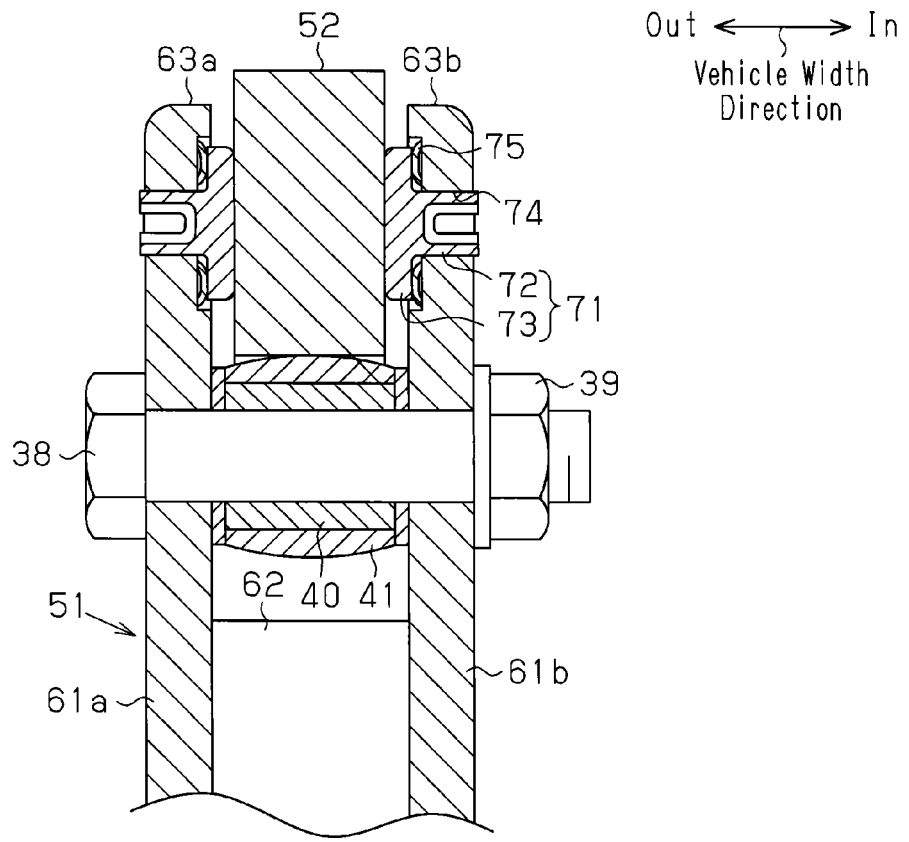
FIG. 15 is a cross-sectional view of a cam side end in the slide mechanism of FIG. 14.

As shown in FIG. 15, resin bushings 71, 71 are arranged on opposing inner surfaces of the two arms 63a and 63b. The resin bushing 71 includes a shaft 72 fitted to hole 74, 74 formed in the two arms 63a and 63b, respectively, and a flange part 73 arranged at one end of the shaft 72. The two resin bushings 71 are fixed by fitting the shafts 72 to the holes 74, 74 from the inner side of the two arms 63a and 63b. Plate springs 75, 75 are arranged between flanges 73, 73 and the inner surfaces of the two arms 63a and 63b. The distance between the two flanges 73, 73 that face each other is set to be the same or slightly shorter than the thickness of the cam 52 in the vehicle width direction.

Like the first embodiment, the bearing 40 and the cam follower 41 fitted to the outer circumferential surface of the bearing 40 are located between the two side walls 61a and 61b. The bearing 40 and the cam follower 41 are located closer to the tubular portion 64 than the resin bushings 71, 71. The bearing 40 is fixed between the two side walls 61a and 61b by inserting the bolt 38 from the outer side of one side wall 61a and the two side walls 61a and 61b, and tightening the nut 39 from the outer side of the other side wall 61b. As described above, the cam follower 41 is drum-shaped. The cam follower 41 rotates relative to the outer circumferential surface of the bearing 40. The cam follower 41 is constantly pushed against the cam surface 24 by the elastic force of the damper stay 15.

Figure 16:
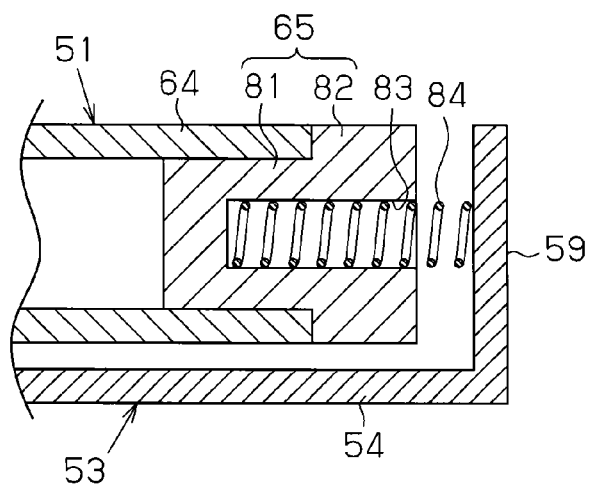
FIG. 16 is a cross-sectional view of an end at the side opposite to the cam in the slide mechanism of FIG. 14.

As shown in FIG. 16, the lid 65 includes a quadrangular prism-shaped insertion portion 81, which is inserted into the tubular portion 64, and a square plate-shaped head 82 arranged at the end on the side opposite to the tubular portion 64 of the insertion portion 81. The lid 65 is fixed to the tubular portion 64 by fitting the insertion portion 81 to the tubular portion 64. The head 82 contacts the edge of the open end of the tubular portion 64. A hole 83 is formed in a side surface opposite to the tubular portion 64 of the lid 65. The hole 83 faces the stopper 59. A compression coil spring 84 is inserted into the hole 83. The first end of the compression coil spring 84 is kept in contact with the inner bottom surface of the hole 83, and the second end is kept in contact with the stopper 59. The compression coil spring 84 is kept slightly compressed. The rod 51 may be moved toward the stopper 59 against the elastic force of the compression coil spring 84.

<Cam>

The cam 52 will now be described.

Figure 17:
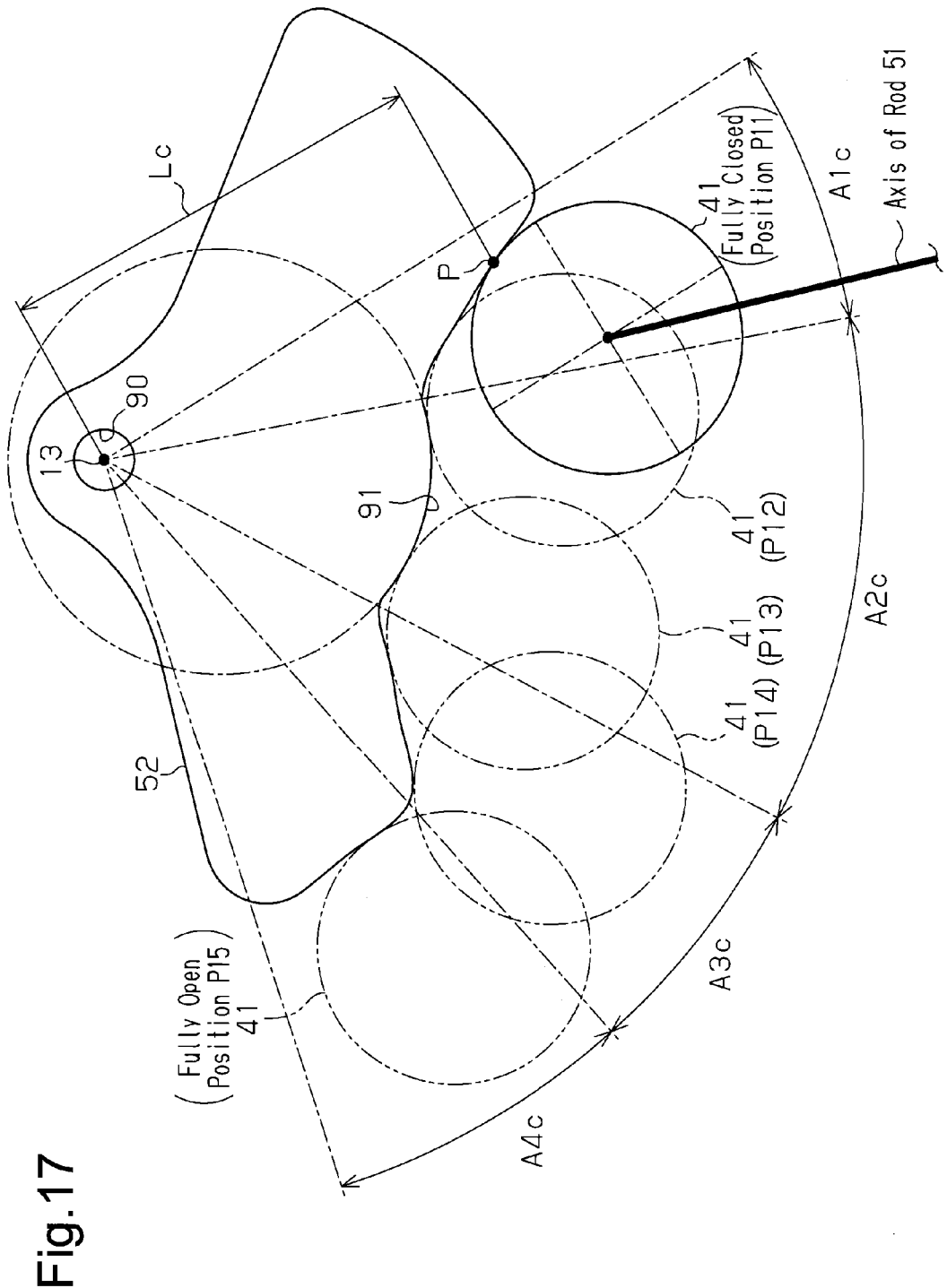
FIG. 17 is a front view taken from the vehicle width direction of the cam of FIG. 14.

As shown in FIG. 17, the cam 52 includes a hole 90, which is a portion fixed to the vehicle body 11. In the drawing, the hole 90 and the support point 13 are coaxially shown for the sake of convenience. The cam follower 41 is constantly pushed against the cam surface 91 of the cam 52 by the elastic force of the damper stay 15. As described above, the cam 52 rotates together with the rear door 12 about the support point 13. The cam follower 41 slides on the cam surface 91 when the cam 52 rotates. Furthermore, the cam follower 41 moves relative to the cam surface 91 between a fully closed position P11 shown by the solid line and a fully open position P15 shown by the double-dashed line in FIG. 17 when the cam 52 rotates. The rod 21 and, consequently, the second end 15b (see FIG. 14) of the damper stay 15, which is the vehicle body side coupling point, moves along the guiding frame 55, more specifically, the two resin bushings 57 and 58, in accordance with the undulation of the cam surface 91.

The cam surface 91 includes first to fourth cam regions A1c to A4c arranged in order from the fully closed side (right side in FIG. 17).

The first cam region A1c includes a region that the cam follower 41 contacts when the rear door 12 is in the fully closed position. The first cam region A1c is planar and formed so that the length Lc of the arm of the moment resulting from the cam reaction force gradually decreases from the fully closed side toward the fully open side. As described above, the length Lc of the arm of the moment is the distance between the support point 13, which is the rotation center of the cam 52, and the contacting point P with the cam follower 41 in the cam surface 91.

The second cam region A2c includes a curved surface (arcuate surface) so that the length Lc of the arm is smaller than the first cam region A1c and is constant regardless of the rotation of the cam 52.

The third cam region A3c is planar and formed so that the length Lc of the arm gradually increases from the fully closed side toward the fully open side.

The fourth cam region A4c includes a region that the cam follower 41 contacts when the rear door 12 is in the fully open position. The fourth cam region A4c is planar and formed so that the length Lc of the arm gradually increases from the fully closed side toward the fully open side.

Thus, the assist moment Mc resulting from the cam reaction force when the cam follower 41 is in contact with the first cam region A1c and the third cam region A3c is greater than the assist moment Mc when the cam follower 41 is in contact with the second cam region A2c. In other words, when the rear door 12 starts to open and finishes opening, the assist moment Mc, which results from a larger cam reaction force, is applied to the rear door 12. The operation characteristics approximate to the operation characteristics shown in FIG. 8 is obtained by setting the shape (cam diameter) of the cam surface 91 in the same manner as the first embodiment.

<Operation of Opening/Closing Assist Device>

The operation of the opening/closing assist device having the above structure will now be described. A case in which the rear door 12 is moved from a fully closed position to a fully open position will be described.

Figure 18:
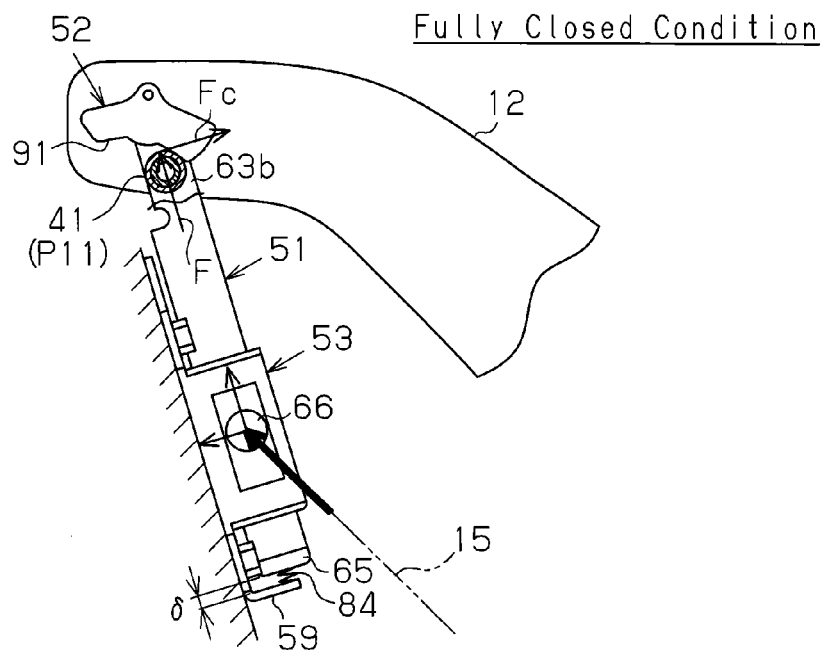
FIG. 18 is a side view taken from the vehicle width direction of the slide mechanism when the rear door is in a fully closed position.

As shown in FIG. 18, when the rear door 12 remains fully closed, the cam follower 41 is located at the fully closed position P11 shown by a solid line in FIG. 17. As shown in FIG. 18, a slight gap δ is formed between the lid 65 and the stopper 59 in this case. The pushing force F, which is based on the elastic force of the damper stay 15, acts on the cam surface 91 of the rod 51 in an upward direction that extends along the axis of the rod 51.

Figure 19:
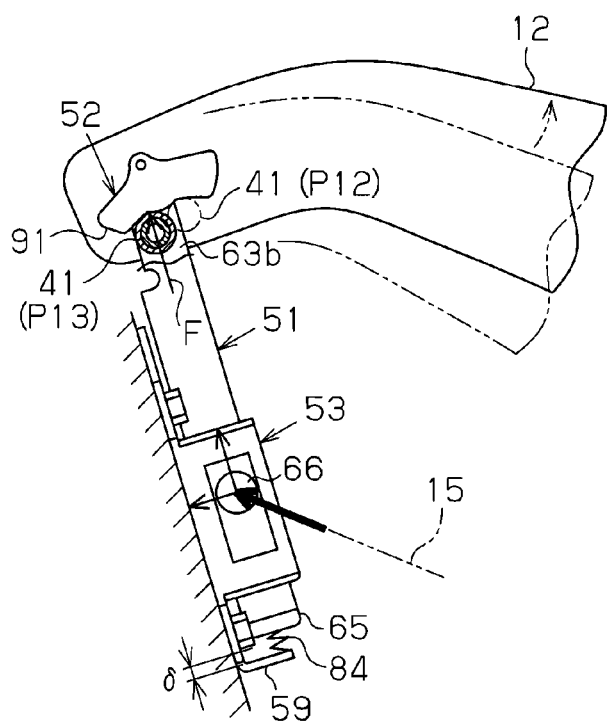
FIG. 19 is a side view taken from the vehicle width direction of the slide mechanism when the rear door starts to open.

As shown by the double-dashed line in FIG. 19, when the rear door 12 starts to open, the cam follower 41 moves relative to the cam surface 91 in the following manner. In other words, as shown in FIG. 17, the cam follower 41 slides in the first cam region A1c when the cam 52 rotates and reaches a boundary position P12 of the first cam region A1c and the second cam region A2c from the fully closed position P11. As the cam follower 41 moves from the fully closed position P1 to the second cam region A2c, the length Lc (cam diameter) of the arm decreases, and the rod 51 is gradually moved to the upper side by the elastic force of the damper stay 15 accordingly. This also gradually increases the gap δ between the lid 65 and the stopper 59. In this case, the pushing force F, which is based on the elastic force of the damper stay 15, acts in an upward direction along the axis of the rod 51.

As shown by a solid line in FIG. 19, when the rear door 12 further opens, the cam follower 41 moves relative to the cam surface 91 in the following manner. As shown in FIG. 17, the cam follower 41 slides in the second cam region A2c as the cam 52 rotates and reaches a boundary position P13 of the second cam region A2c and the third cam region A3c from the boundary position P12 of the first cam region A1c and the second cam region A2c. In the second cam region A2c, the length Lc (cam diameter) of the arm is constant. Thus, the rod 51 does not move vertically when the cam follower 41 is sliding in the second cam region A2c. In other words, the gap δ between the lid 65 and the stopper 59 also remains constant. In this case, the pushing force F, which is based on the elastic force of the damper stay 15, acts in an upward direction along the axis of the rod 51.

Figure 20:
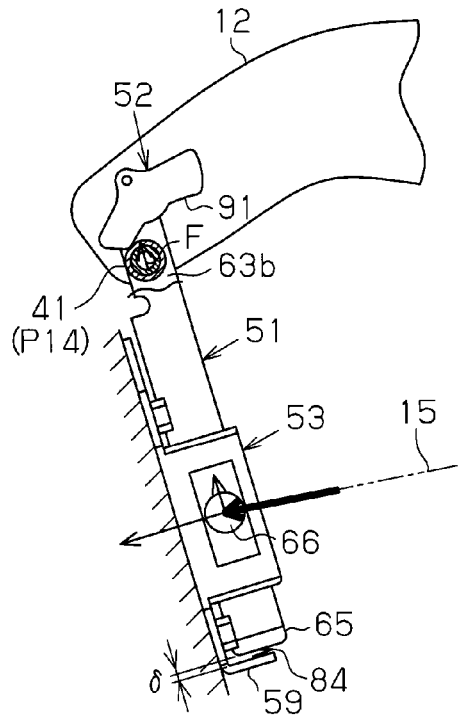
FIG. 20 is a side view taken from the vehicle width direction of the slide mechanism when the rear door is opening.

As shown in FIG. 20, when the rear door 12 further opens, the cam follower 41 is moved relative to the cam surface 91 in the following manner. As shown in FIG. 17, the cam follower 41 slides in the third cam region A3c when the cam 52 rotates and reaches a boundary position P14 of the third cam region A3c and the fourth cam region A4c from the boundary position P13 of the second cam region A2c and the third cam region A3c. As the cam follower 41 slides in the third cam region A3c toward the boundary position P14, the length Lc (cam diameter) of the arm increases. Thus, the rod 51 gradually moves to the lower side against the elastic force of the damper stay 15 and the elastic force of the compression coil spring 84 accordingly. As a result, the gap δ between the lid 65 and the stopper 59 also gradually decreases. The gap δ in this case is smaller than the gap δ (see FIG. 18) when the rear door 12 is maintained at the fully closed position. When the cam follower 41 reaches the boundary position P14, the pushing force F, which is based on the elastic force of the damper stay 15, also acts in an upward direction along the axis of the rod 51.

Figure 21:
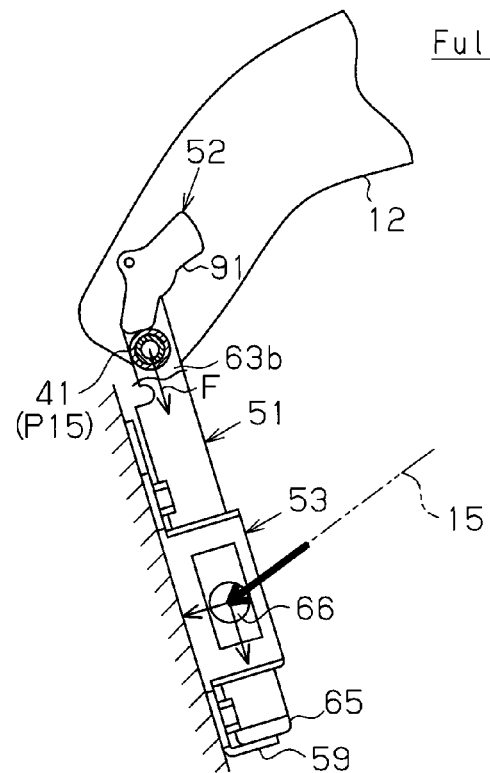
FIG. 21 is a side view taken from the vehicle width direction of the slide mechanism when the rear door is in the fully open position.

As shown in FIG. 21, when the rear door 12 further opens, the cam follower 41 is moved relative to the cam surface 91 in the following manner. In other words, as shown in FIG. 17, the cam follower 41 slides in the fourth cam region A4c beyond the boundary position P14 of the third cam region A3c and the fourth cam region A4c and reaches the fully open position P15 when the cam 52 rotates. As the cam follower 41 slides in the fourth cam region A4c toward the fully open position P15, the length Lc (cam diameter) of the arm increases, and the rod 51 gradually moves to the lower side against the elastic force of the damper stay 15 and the elastic force of the compression coil spring 84 accordingly. The lid 65 contacts the stopper 59 when the cam follower 41 reaches the fully open position P15. In other words, the gap δ between the lid 65 and the stopper 59 becomes 0 (zero).

At the timing in which the position of the cam follower 41 relative to the cam surface 91 moves from the third cam region A3c to the fourth cam region A4c, the pushing force F, which is based on the elastic force of the damper stay 15 and has been acting in the upward direction, switches to act in a downward direction along the axis of the rod 51. In this case, the rod 51 moves toward the lower side. However, the movement toward the lower side of the rod 51 is restricted when the lower end of the rod 51 (more precisely, the lid 65) contacts the stopper 59.

At a timing in which direction the pushing force F acts switches from the upward direction to the downward direction, the cam follower 41 is guided by the third cam region A3c and the fourth cam region A4c of the cam surface 91 so that the rod 51 gradually approaches the stopper 59. In other words, the inclination of the third cam region A3c and the fourth cam region A4c, more specifically, the length Lc (cam diameter) of the arm is set so that the rod 51 gradually approaches the stopper 59.

As described above, when the direction the pushing force F, which is based on the elastic force of the damper stay 15, acts is switched from the upward direction to the downward direction, the gap δ between the rod 51 and the stopper 59 becomes smaller than the gap δ when the rear door 12 is maintained in the fully closed position. The rod 51 also moves toward the lower side (stopper 59) against the elastic force of the compression coil spring 84. Thus, by minimizing the gap δ at the timing the direction the pushing force F acts is switched and by moving the rod 51 toward the lower side when the upward elastic force of the compression coil spring 84 is acting, sudden downward movement of the rod 51 is limited. This reduces the impact when the rod 51 contacts the stopper 59.

Therefore, when opening the rear door 12, even when the direction the pushing force F, which is based on the elastic force of the damper stay 15, acts is switched from the upward direction to the downward direction, the rod 51 is not separated from the guiding member 53 (more precisely, guiding frame 55 or resin bushings 57 and 58). The operation of the slide mechanism 16 when closing the rear door 12 is reversed from the operation performed when opening the rear door 12.

Advantages of Embodiment

The present embodiment has the following advantages in addition to advantages (1) to (6), (8), and (9) of the first embodiment.

(10) The cam 52 of the present example does not include an elongated hole and differs from the cam 22 shown in FIG. 7 including the elongated hole 42. This allows the cam 52 to have smaller dimensions (size) compared to when the cam 52 includes an elongated hole (cam groove). This increases the efficiency for installing the cam 52 in the vehicle.

(11) The pushing force F, which is based on the elastic force of the damper stay 15, acts on the rod 51 in a direction that may be switched from the upward direction to the downward direction when the rear door 12 widely opens toward the upper side. In this case, the cam follower 41 and, consequently, the rod 51 move toward the lower side. The cam 52 of the present example does not include the elongated hole, to which the cam follower 41 is locked, and differs from the cam 22 shown in FIG. 7. Thus, the rod 51 may be separated from the guiding member 53. In this regard, in the present example, the stopper 59 faces the lower end of the rod 51, more specifically, the lid 65. Thus, the rod 51 contacts the stopper 59 and prevents the rod 51 from slipping out of the guiding member 53.

(12) The compression coil spring 84 is located between the lower end of the rod 51 and the stopper 59. Thus, when the direction the pushing force F acts is switched from an upward direction to a downward direction and the rod 51 is moved toward the lower side, the rod 51 is moved toward the lower side against the elastic force of the compression coil spring 84. This limits sudden movement of the rod 51 toward the lower side. Further, the rod 51 gradually contacts the stopper 59. In other words, the impact when the rod 51 contacts the stopper 59 and the generation of abnormal noise or the like is suppressed.

(13) Furthermore, the inclination of the third cam region A3c and the fourth cam region A4c in the cam surface 91 is set to gradually move the rod 51 to the lower side when the cam 52 rotates from a time point slightly before the timing the direction the pushing force F acts is switched from the upward direction to the downward direction. Thus, when the acting direction of the pushing force F is switched from the upward direction to the downward direction, the gap δ between the rod 51 and the stopper 59 becomes small. In other words, even if the direction the pushing force F acts is switched from the upward direction to the downward direction when the rod 51 is located close to the stopper 59, the distance the rod 51 moves is very small. This further reduces the impact when the rod 51 contacts the stopper 59 in combination with the effect of the elastic force of the compression coil spring 84 described above.

Other Embodiments

Each embodiment described above may be modified as described below.

The elongated hole 42 in the first embodiment may be a non-through elongated groove. In this case, the cam follower 41 is cantilevered from a single arm 34 and rotatably supported. Further, the cam follower 41 is inserted into the elongated groove.

In the first and second embodiments, the rod 21 has a quadrangular prism shape but may have other polygonal prism shapes such as a triangular prism, a pentagonal prism, and the like. The rod 21 may also have an elliptical cylinder shape. In these cases, the rotation of the rod 21 may also be suppressed.

In the third embodiment, the rod 51 and the guiding member 53 may be replaced with a structure similar to the first embodiment shown in FIG. 5, that is, the rod 21 and the guiding member 31. In this case, the two arms 34, 34 are coupled to the distal end portion of the rod 21, and the cam 52 is sandwiched by the arms 34, 34.

In third embodiment, the compression coil spring 84 may be omitted. In this case, the hole 83 does not need to be formed in the lid 65. In this case, the rod 51 also contacts the stopper 59 and prevents separation of the rod 51 from the guiding member 53.

Figure 22A:
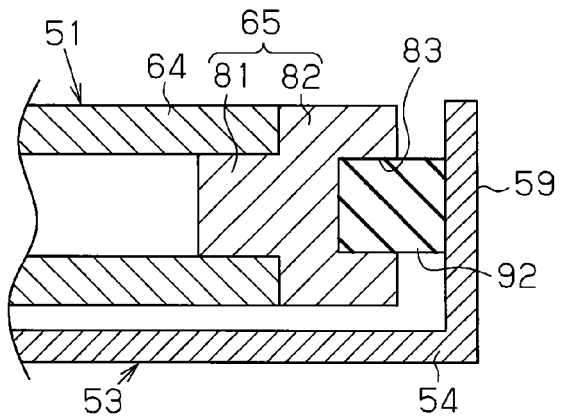
FIGS. 22($a$) and 22($b$) are cross-sectional views of the end at the side opposite to the cam in slide mechanisms of other embodiments.
Figure 22B:
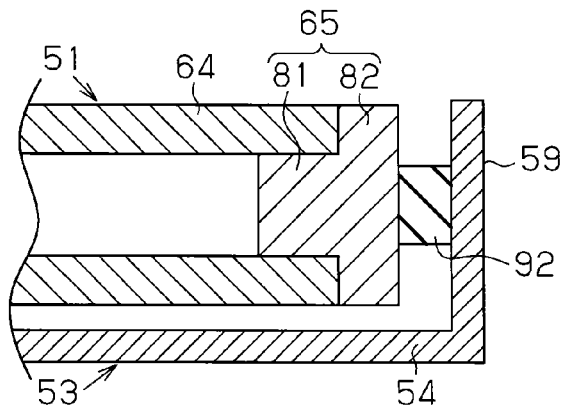

In the third embodiment, the compression coil spring 84 functioning as a buffer member may be replaced with an elastic body 92 such as a rubber member, a sponge, or the like, as shown in FIG. 22(*a*). As shown in FIG. 22(*b*), the compression coil spring 84 may be omitted and the hole 83 may be filled, and the elastic body 92 may be located between the bottom surface of lid 65 and the stopper 59. In this case, the compression coil spring 84 may be used as the elastic body. The elastic force of the elastic body 92 has a buffer effect when the rod 51 contacts the stopper 59. The elastic body 92 corresponds to the buffer member.

Figure 23:
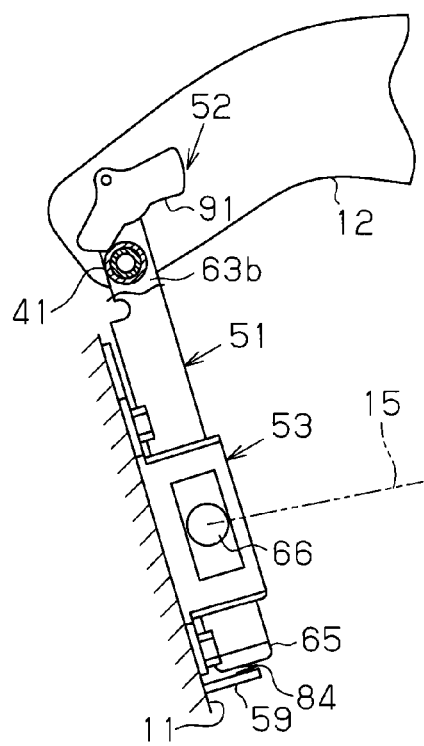
FIG. 23 is a side cross-sectional view of the end at the side opposite to the cam in a slide mechanism of a further embodiment.

In the third embodiment, the stopper 59 is integrated with the guiding member 53 but may be separate member from the guiding member 53. For example, as shown in FIG. 23, the stopper 59 may be arranged on the vehicle body 11. The compression coil spring 84 is located between the lid 65 and the stopper 59.

In the third embodiment, the stopper 59 is integrated with the guiding member 53 but may be located at other areas separated from the guiding member 53. For example, as shown by the double-dashed line in FIG. 14, the stopper 93 is arranged on the rod 51. The stopper 93 is, for example, rod-shaped and arranged on at least one of the two side walls 61*a* and 61*b*. When the stopper 93 contacts the guiding member 53 (more precisely, resin bushing 57), movement of the rod 51 toward the lower side (side opposite to the cam 52) is restricted.

In the third embodiment, the cam 52 is arranged on the rear door 12, but may be arranged in the vicinity of the support point 13 in the vehicle body 11 like the second embodiment. In this case, the rod 51 is slidable relative to the rear door 12. The door side coupling point and the vehicle body side coupling point of the damper stay 15 are reversed from the third embodiment. In other words, the first end 15*a* of the damper stay 15 is rotatably coupled to the rod 51 that moves straight back and forth along the rear door 12, and the second end 15*b* is pivotally coupled to the vehicle body 11. In this case, the stopper 59 may be arranged on the rear door 12 as a separate member.

Each embodiment is an example for manually opening and closing the rear door 12 but may be applied to a so-called power rear door for automatically opening and closing the rear door 12. In this case, a drive source such as a motor is incorporated in the damper stay 15, and the piston rod 18 is extended and retracted by driving the drive source. The thrust force of a large motor is required as the weight of the rear door 12 increases. The thrust force of the motor is, for example, the force that pushes the piston rod 18 in the extending direction.

In each embodiment, the weight moment Mg of the rear door 12 and the assist moments Ma and Mc produced by the opening and closing assist device 14 are balanced at each of the fully closed position and fully open position of the rear door 12 by controlling the shape of the cam surface. Thus, the thrust force of the motor required to open and close the rear door may be reduced. This allows a smaller motor to be used. Hence, the same damper stay may be used for all vehicle types.

In the prior art, damper stays holding motors are connected to two locations, one left and one right, on the vehicle body 11. Now, one may be a damper stay that includes a motor and the other may be a damper stay that does not include the motor. A damper stay that includes a motor is expensive compared to a damper stay that does not include a motor. Thus, if one of the two damper stays is a damper stay that does not include a motor, the manufacturing cost of the opening/closing assist device 14 can be reduced accordingly.

Figure 24:
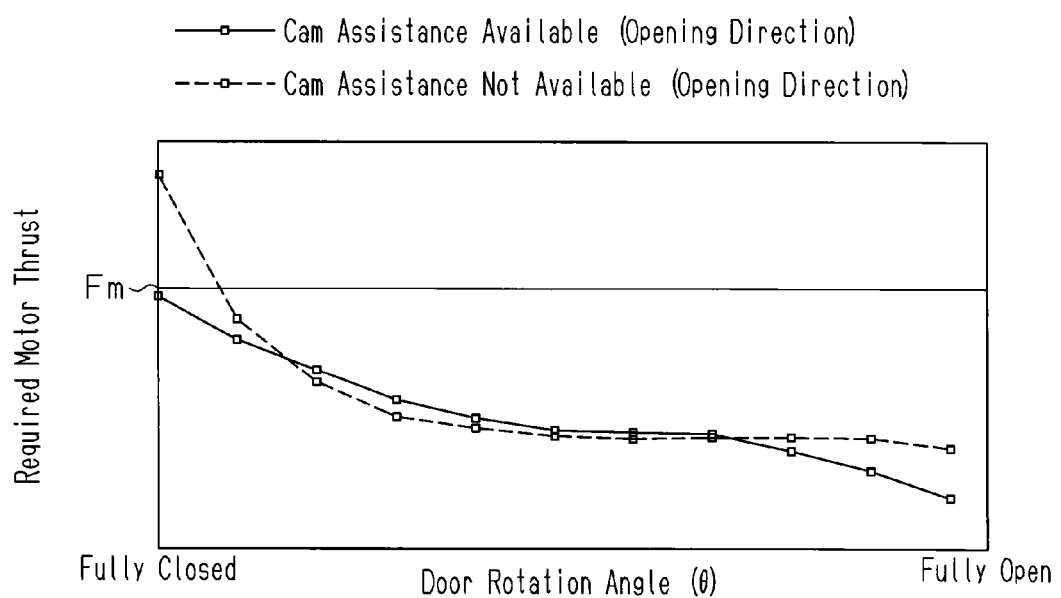
FIG. 24 is a graph showing the relationship of the opening of the door and the required motor thrust force in another embodiment.

For example, a case in which the first embodiment is applied to the power rear door will now be described will now be described with reference to the graph of FIG. 24. In the graph, the horizontal axis indicates the open degree θ of the rear door 12, the vertical axis indicates the thrust force of the motor required when opening the rear door 12. As shown in the graph, a target value Fm of the motor thrust force at which the rear door 12 can open and close with one motor is set.

As shown by the broken lines connecting squares in the graph, when the assist moment Mc resulting from the cam 22 does not exist, the thrust force of the motor required when the rear door 12 starts to open greatly exceeds the target value Fm. Thus, it is difficult to open the rear door 12 with one motor.

In contrast, as shown by the solid line connecting squares in the graph, when the cam 22 produces the assist moment Mc, the thrust force required for the motor when the rear door 12 starts to open may be smaller than the target value Fm. Thus, the rear door 12 may be opened with one motor.

An example of incorporating the drive source such as the motor and the like in the damper stay 15 has been described. However, the drive source may be arranged at a location separated from the damper stay 15. For example, the drive source may be installed on a pillar or a roof.

In each embodiment, the opening/closing operation force of the rear door 12 is assisted by the opening/closing assist device 14. However, the operation force of the opening/closing body other than a rear door that opens/closes in the vertical direction such as a lid body, a cover, or the like arranged on a vehicle may be assisted. Further, the opening/closing assist device 14 does not have to be applied to the vehicle. The operation force of an opening/closing body such as a door arranged on a structure other than a vehicle, a building, or the like that opens and closes in the vertical direction may be assisted. The opening/closing assist device 14 can be used to assist the opening/closing operation force of the general opening/closing body that opens and closes in the vertical direction.

The opening and closing subject assisted by the opening/closing assist device 14 is not limited to the opening/closing body that rotates in the vertical direction along the gravitational force. More specifically, the opening/closing assist device 14 may assist the opening/closing of the opening/closing body irrespective of the opening/closing direction of the opening/closing body. For example, an opening/closing body that is coupled to the vehicle body 11 or a subject other than the vehicle body 11 and that rotates in the left and right direction along the horizontal plane (plane orthogonal to the direction of gravitational force) such as the ground and the like may be the opening and closing subject assisted by the opening/closing assist device 14. Even if gravitational force (weight) does not act on the rotation direction of the opening/closing body, the opening/closing of the opening/closing body may be assisted by setting of the shape of the cams 22 and 52.

DESCRIPTION OF REFERENCE CHARACTERS

11 vehicle body (coupling subject)
12 rear door (opening/closing body)
13 pivot point
14 opening/closing assist device
15 damper stay
15a first end
15b second end
21, 51 rod (contact element)
22, 52 cam
24, 91 cam surface
41 cam follower (contact element)
42 elongated hole (groove)
84 compression coil spring (buffer member)
53 guiding member
92 elastic body
59, 93 stopper

The invention claimed is:

1. An opening/closing assist device for an opening/closing body, wherein the opening/closing assist device supplements an operation force required to open and close the opening/closing body that rotates about a support point located on a coupling subject of the opening/closing body, the opening/closing assist device comprising:
    a damper stay configured to be located between the coupling subject and the opening/closing body, wherein the damper stay produces elastic force that supplements the operation force;
    a cam configured to be fixed to a first member, which is one of the opening/closing body and the coupling subject, in the vicinity of the support point; and
    a contact element configured to be located on a second member, which is the other one of the opening/closing body and the coupling subject, wherein the contact element is slidable in a direction intersecting a rotation axis of the opening/closing body,
    wherein the damper stay includes a first end, rotatably coupled to the first member, and a second end, rotatably coupled to the contact element, and keeps the contact element pushed against the cam by the elastic force, and
    the cam has a shape that is set so that a moment generated at the cam based on the elastic force applied by the contact element is generated so that a moment required to rotate the opening/closing body is in accordance with operation characteristics required for the opening/closing body;
    wherein the opening/closing body is configured to rotate about the support point in a vertical direction along gravitational force, the contact element is configured to slide in the vertical direction intersecting a direction in which the rotation axis of the opening/closing body extends in cooperation with the rotation of the opening/closing body, and the damper stay is configured so that a direction the elastic force of the damper stay acts on the contact element is switched from an upward direction to a downward direction when the opening/closing body opens in the upward direction;
    the opening/closing assist device includes a guiding member located on the second member and receiving the contact element to guide the sliding of the contact element in the vertical direction; and
    a stopper is located between the contact element and the guiding member, between the contact element and the coupling subject, or between the contact element and the opening/closing body, wherein the stopper engages the contact element that moves down when the direction the operation force of the damper stay acts on the contact element is switched from the upward direction to the downward direction.

2. The opening/closing assist device for an opening/closing body according to claim 1, wherein the opening/closing body is configured to rotate about the support point in a vertical direction extending along gravitational force, and the shape of the cam is set such that a sum of the moment generated at the opening/closing body based on the elastic force and the moment generated at the cam based on the elastic force is balanced with a moment resulting from the weight of the opening/closing body.

3. The opening/closing assist device for an opening/closing body according to claim 1, wherein the shape of the cam is set so that a cam diameter, which is a distance between a rotation axis of the cam and a cam surface against which the contact element is pushed, differs in each portion of the cam surface.

4. The opening/closing assist device for an opening/closing body according to claim 1, wherein the stopper is arranged facing the contact element below a movement direction of the contact element; and the shape of the cam is set so that the contact element approaches the stopper as a timing becomes close at which the direction the elastic force of the damper stay acts on the contact element switches from the upward direction to the downward direction when the opening/closing body opens.

5. The opening/closing assist device for an opening/closing body according to claim 4, wherein a buffer member is located between the contact element and the stopper.

* * * * *